(12) United States Patent
Egeler et al.

(10) Patent No.: US 10,839,610 B2
(45) Date of Patent: *Nov. 17, 2020

(54) METHODS AND SYSTEMS FOR CUSTOMIZING A SCENE FOR PRESENTATION TO A USER

(71) Applicant: Verizon Patent and Licensing Inc., Arlington, VA (US)

(72) Inventors: Christian Egeler, Roseland, NJ (US); Xavier Hansen, Parsippany, NJ (US); Mohammad Raheel Khalid, Budd Lake, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,440

(22) Filed: Jul. 8, 2019

(65) Prior Publication Data

US 2019/0333280 A1 Oct. 31, 2019

Related U.S. Application Data

(63) Continuation of application No. 15/339,656, filed on Oct. 31, 2016, now Pat. No. 10,388,072.

(51) Int. Cl.
*G06T 19/00* (2011.01)
*G06T 17/10* (2006.01)
*G06F 16/583* (2019.01)
*G06F 3/01* (2006.01)

(52) U.S. Cl.
CPC ........... *G06T 19/006* (2013.01); *G06F 3/011* (2013.01); *G06F 16/5854* (2019.01); *G06T 17/10* (2013.01)

(58) Field of Classification Search
None
See application file for complete search history.

(56) References Cited

U.S. PATENT DOCUMENTS

| 8,645,230 B2 | 2/2014 | Oliver et al. |
| 9,597,584 B1 | 3/2017 | George et al. |
| 9,911,232 B2 | 3/2018 | Shapira et al. |
| 2009/0213114 A1 | 8/2009 | Dobbins et al. |

(Continued)

OTHER PUBLICATIONS

"Microsoft Hololens", Microsoft, https://en.wikipedia.org/wiki/Microsoft_Hololens, as accessed on Oct. 31, 2016, 7 pages.

*Primary Examiner* — Jeffrey J Chow

(57) ABSTRACT

An exemplary scene customization system detects a selection, by a user of an artificial reality device, of a customization scheme to be applied to an original immersive scene. The system generates a custom immersive scene based on an application of the selected customization scheme to the original immersive scene. This generating of the custom immersive scene includes identifying, within a dynamic volumetric model of the original immersive scene, a particular object that is of a particular object type and is included in the original immersive scene. This generating of the custom immersive scene also includes replacing, within the dynamic volumetric model and in accordance with the applied customization scheme, the particular object with a custom object that is predetermined within the applied customization scheme to correspond to the particular object type. The system also presents the custom immersive scene to the user by way of the artificial reality device.

20 Claims, 13 Drawing Sheets

(56) References Cited

U.S. PATENT DOCUMENTS

| | | |
|---|---|---|
| 2011/0040542 A1 | 2/2011 | Sendhoff et al. |
| 2015/0138234 A1 | 5/2015 | Yoon et al. |
| 2016/0012643 A1 | 1/2016 | Kezele et al. |
| 2016/0027215 A1 | 1/2016 | Burns et al. |
| 2017/0103584 A1 | 4/2017 | Vats |
| 2017/0270698 A1 | 9/2017 | Goslin |
| 2017/0307888 A1 | 10/2017 | Kohler et al. |
| 2018/0082480 A1 | 3/2018 | White et al. |
| 2018/0101966 A1 | 4/2018 | Lee et al. |

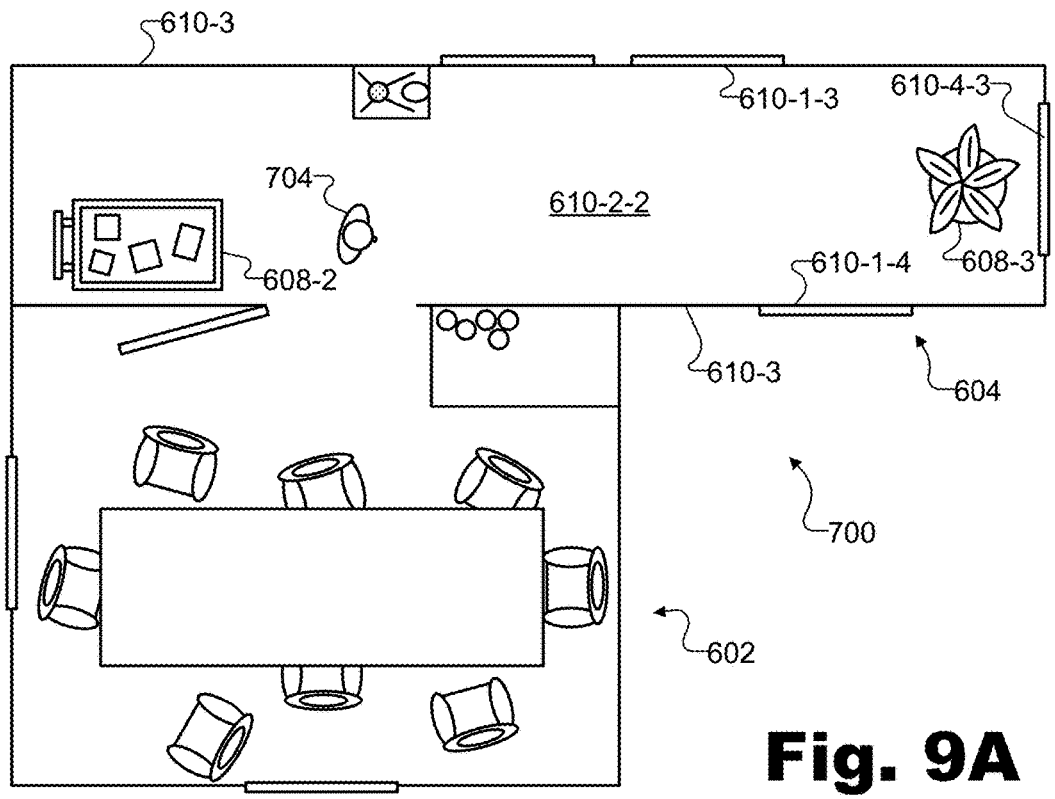
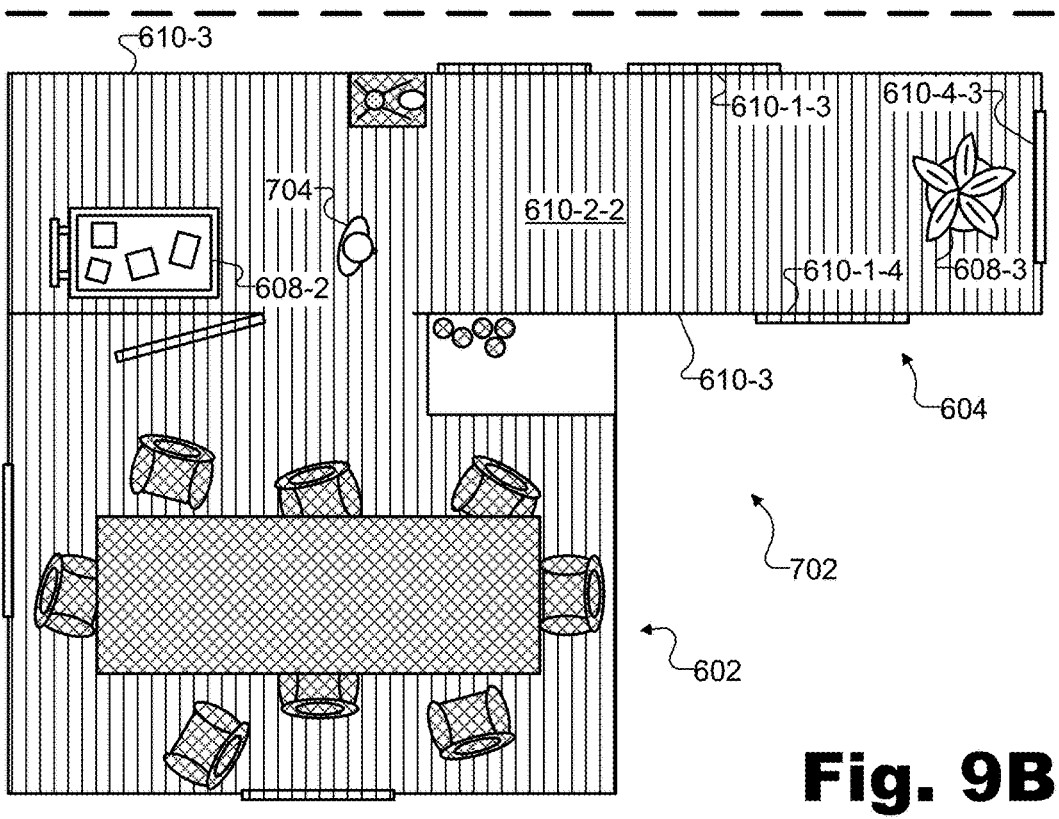
Fig. 9A
Fig. 9B

METHODS AND SYSTEMS FOR CUSTOMIZING A SCENE FOR PRESENTATION TO A USER

RELATED APPLICATIONS

This application is a continuation application of U.S. patent application Ser. No. 15/339,656, filed Oct. 31, 2016, and entitled "Methods and Systems for Dynamically Customizing a Scene for Presentation to a User," which is hereby incorporated by reference in its entirety.

BACKGROUND INFORMATION

Advances in computing and networking technology have made new forms of artificial reality (e.g., virtual reality, augmented reality, diminished reality, mixed reality, etc.) possible. For example, virtual reality technology may allow a user to perceive and experience an interactive and/or immersive virtual reality world that is completely distinct from an environment that surrounds the user in actuality. The user may look around the immersive virtual reality world in any direction (e.g., forward, backward, left, right, up, down, etc.), giving the user a sense that he or she is actually present in and experiencing the immersive virtual reality world. As another example, augmented reality technology may allow a user to perceive and experience an interactive and/or immersive augmented reality world that is based on, or closely associated with, an environment that surrounds the user in actuality. Within an augmented reality experience, for instance, the user may perceive various aspects of the environment actually surrounding the user, but the environment may be augmented by an addition of virtual objects and/or other elements that are not actually present in the environment.

In spite of various advances in artificial reality technologies, many users continue to segregate artificial reality experiences from real life experiences that are not altered or generated artificially. For example, users may go to work and/or otherwise go about their business each day without using artificial reality technology and then may engage in an artificial reality session (e.g., watching a virtual reality media program, playing an augmented reality game, etc.) only after work and/or other real-life obligations are completed. However, as computing, networking, and other technologies improve, customized and enhanced artificial reality technologies have the potential to become much more prevalent in many more people's lives, not just after work, but throughout the day. As a result, opportunities exist to provide larger numbers of users with artificial reality technologies capable of making the users more efficient, allowing the users to exert more control over their environments, and enhancing the environments that the users spend time in by making the environments more interesting, diverse, convenient, aesthetically pleasing, and/or fun.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 9A illustrates additional exemplary elements of the dynamic volumetric model of FIG. 7A according to principles described herein.

FIG. 9B illustrates additional exemplary elements of the custom immersive scene dynamically generated based on the dynamic volumetric model of FIG. 9A according to principles described herein.

DETAILED DESCRIPTION OF PREFERRED EMBODIMENTS

Figure 1:
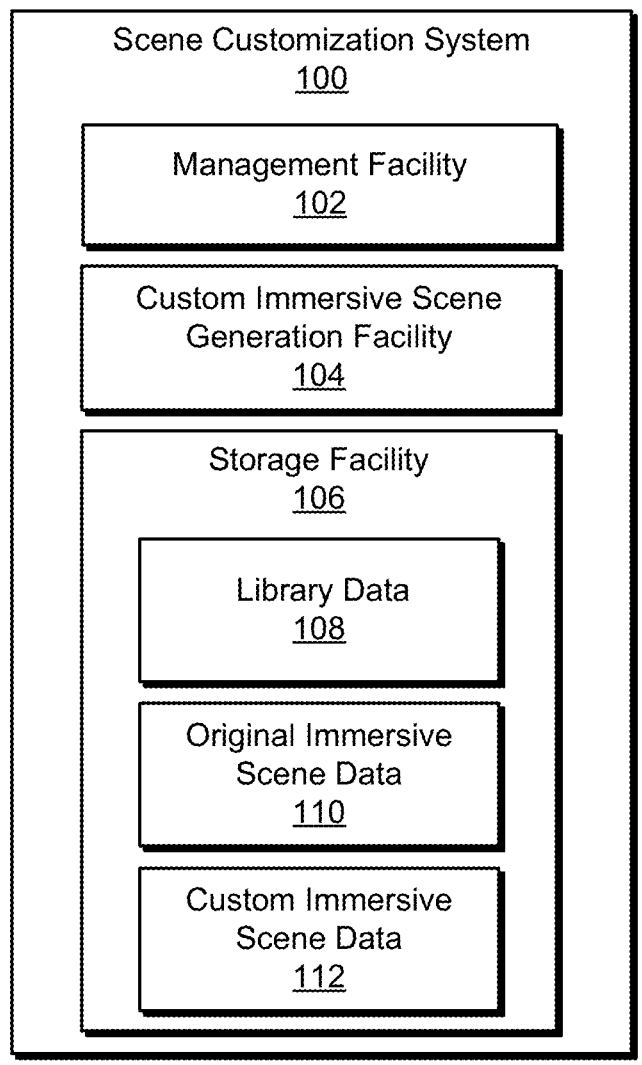
FIG. 1 illustrates an exemplary scene customization system that dynamically customizes a scene for presentation to a user according to principles described herein.

Methods and systems for dynamically customizing a scene for presentation to a user are described herein. As used herein, a "scene" or an "immersive scene" may refer to any real-world or artificially-generated (i.e., fully or partially virtual) environment or world in which a user may be located and/or which the user may experience. More specifically, a place or environment within the real world (i.e., as opposed to a virtual or artificially-generated world) in which the user may be located or desire to be located may be referred to herein as a "real-world scene." Real-world scenes may refer to any real-world scenery, real-world locations, real-world events (e.g., live events, etc.), or other places or environments existing in reality (i.e., as opposed to existing only virtually). For example, a real-world scene may include any indoor or outdoor real-world location such as the streets of a city, a museum, a scenic landscape, a location in outer space (e.g., orbiting and looking down upon the Earth), the surface of another planet, or the like.

In certain examples, a real-world scene may refer to a scene that actually surrounds the user (i.e., a scene in which the user is actually located), while in other examples, a real-world scene may refer to a scene that is distinct from the scene that actually surrounds the user (i.e., a scene in a different place than where the user is located). A real-world scene may be associated with a real-world event such as a sporting event (e.g., a basketball game, an Olympic event, etc.), a concert (e.g., a rock concert in a large venue, a classical chamber concert in an intimate venue, etc.), a theatrical presentation (e.g., a Broadway musical, an outdoor pageant, etc.), a large-scale celebration (e.g., New Year's Eve on Times Square, Mardis Gras, etc.), a race (e.g., a stock-car race, a horse race, etc.), a political event (e.g., a presidential debate, a political convention, etc.), or any other real-world event that may interest potential users. In the same or other examples, the real-world scene may be associated with a setting for a fictionalized scene (e.g., a set of a live-action virtual reality television show or movie) and/or any other scene at any other indoor or outdoor real-world location as may serve a particular implementation.

Other immersive scenes described herein may not be real-world scenes, but, rather, may be at least partially artificially generated. For example, certain immersive scenes may be completely virtual (e.g., such as computer-generated virtual worlds used in video games). Other immersive scenes may be based on real-world scenes, but may include one or more virtual objects or other elements that have been added to the real-world scene or have replaced real objects or other elements within the real-world scene. For example, as will be described in detail below, custom immersive scenes may be dynamically generated from original immersive scenes (e.g., real-world scenes or artificially generated scenes) by replacing original objects within the original immersive scenes with custom objects according to methods and system described herein.

As used herein, an "object" (e.g., an original object, a custom object, etc.) included in a scene, may include anything, whether living or inanimate, that is associated with (e.g., located within or around) the scene. For example, as will be described and illustrated below, if a scene includes a conference room in an office setting, objects associated with the scene may include a conference table, chairs around the conference table, people in the conference room and their effects (e.g., clothing, papers, briefcases, coffee mugs, etc.), a floor in the room, a ceiling in the room, doors and/or windows around the edges of the room, walls of the room, and/or other objects present within and/or otherwise associated with the conference room.

As will be described and illustrated below, a scene customization system may dynamically customize a scene (e.g., customizing an original immersive scene to dynamically generate a custom immersive scene) for presentation to a user in any way described herein and/or as may serve a particular implementation. For example, the scene customization system may detect a selection, by a user, of a customization scheme to be applied to an original immersive scene throughout a scene customization session to be experienced by the user by way of an artificial reality device. For example, the artificial reality device may be implemented by an immersive headset device or another device capable of providing or facilitating an artificial reality experience (e.g., a virtual reality experience, an augmented reality experience, etc.), as described in more detail below.

As used herein, a "customization scheme" may refer to any theme, concept, pattern, motif, filter, "skin," subject, or other type of arrangement upon which customization of an original immersive scene may be based. For example, customization schemes may be centered around themes relating to particular time periods of historical significance (e.g., a medieval European scheme, a 19th Century New York scheme, etc.); time periods of pop culture, nostalgic, or other significance (e.g., a 50s diner scheme, a 20s jazz club scheme, etc.); popular fiction (e.g., a Harry Potter Hogwarts scheme, a Star Trek USS Enterprise scheme, etc.); particular aesthetics (e.g., a futuristic scheme, a fantasy castle scheme, a beach scheme, etc.); real-world places (e.g., a Venice Italy scheme, a scheme based on the moon or another planet, etc.); and/or any other theme, motif, etc., as may serve a particular implementation. In other examples, a customization scheme may not follow any particular theme per se. For example, a customization scheme may be implemented that is customized for a particular location (e.g., a user's home, yard, office, etc.) but may not follow a theme such as those described above. Instead, the customization scheme may include art (e.g., favorite paintings, sculptures, etc.), design (e.g., old English brick, brushed aluminum paneling, etc.), and/or other objects or elements that may not actually exist at the particular location, but that the user desires to perceive at the location during certain scene customization sessions.

As used herein, a "scene customization session" may refer to a time period during which a particular customization scheme is activated or applied to an original immersive scene. Scene customization sessions may have any duration as may serve a particular implementation. For example, a user experiencing the real world using an immersive headset device may wear the device throughout the day such that any or all of the user's home, commute, office, etc., may adhere to the customization scheme to give the user a sensation that he or she is living and working, for example, in Hogwarts, in medieval Europe, or on Mars for the day. In other examples, a scene customization session may have a duration lasting for a more limited amount of time (e.g., less than one or two hours, etc.) to provide the user with a more temporary diversion akin to traditional media content such as television programs, movies, and/or video games. In some examples, scene customization sessions may follow one another in sequence. For example, if a user has selected a particular customization scheme such as a medieval customization scheme for one scene customization session, the user may begin a new scene customization session at any time by deactivating the medieval customization scheme (e.g., when the user wishes to stop experiencing the artificial reality world) and/or by activating a different customization scheme such as a futuristic customization scheme (e.g., when the user tires of the medieval customization scheme and/or is ready for a change).

Once the user has selected a customization scheme, the scene customization system may dynamically generate a custom immersive scene based on an application of the selected customization scheme to the original immersive scene. For example, the scene customization system may dynamically generate the custom immersive scene by receiving data representative of the original immersive scene. The original immersive scene may include the real-world scene surrounding the user in the case of an augmented reality experience, a distinct real-world scene or another scene (e.g., an artificially-generated scene) in the case of a virtual reality experience, or any other original immersive scene as may serve a particular implementation. Based on the received data representative of the original immersive scene, the scene customization system may develop (e.g., receive, create, and/or continually update) a dynamic volumetric model of the original immersive scene. Within the dynamic volumetric model of the original immersive scene being developed, the scene customization system may identify one or more objects included in the original immersive scene and may replace the one or more objects with one or more custom objects (e.g., within the dynamic volumetric model) in accordance with the applied customization scheme. The scene customization system may present (e.g., throughout the scene customization session), the dynamically generated custom immersive scene to the user by way of the artificial reality device. Specific examples of dynamically generating and presenting a custom immersive scene throughout a scene customization session will be described in more detail below.

By dynamically customizing a scene for presentation to a user according to the systems and methods described herein, a scene customization system may provide various benefits to a user. In examples related to augmented reality, for instance, users may feel less inclined to segregate augmented reality experiences from real life experiences that are not altered or generated artificially, and, instead, may integrate augmented reality deeper into their lives to enrich their daily experiences. As one example, users may customize various aspects of their lives to be more aesthetically pleasing and/or more varied and diverse (e.g., by virtually placing favorite art or design styles around the house and/or office). As another example, rather than commuting to work on the same train and/or working in the same cubicle each day, a user may customize and give variety to his or her experiences by customizing the commute and the office according to customization schemes that give the user the sensation that he or she is working a new exotic location each day, is passing through a more interesting and/or beautiful route on the way to work than may be the case in reality, and the like. Examples related to virtual reality may be associated with similar benefits, even if the virtual reality experiences may not integrate with the user's regular life to the same degree that augmented reality experiences do. For example, rather than watching a football game being broadcast as a virtual reality experience according to the real-world scene (e.g., the stadium, field, etc.) that the football game is actually taking place within, a user may experience the virtual reality football game as if the stadium were on top of a snow-covered mountain having harrowing cliffs surrounding the field, or with any other customization as may serve a particular implementation.

Moreover, along with aesthetic, entertainment, and experience diversification benefits such as those described above, the systems and methods described herein may also provide social and/or more functional benefits. In some examples, customization schemes may include useful elements such as information (e.g., a newspaper, a website, etc.) that may replace or be added to an original immersive scene to provide information to a user in a more convenient way. For example, a surface of a table that the user eats breakfast at each morning may be replaced by top news stories that the user may conveniently browse during his or her meal. As will be described in more detail below, dynamic scene customization described herein may facilitate and/or enhance social interaction when, for example, users share customization schemes and/or scene customization sessions, co-inhabit custom immersive scenes based on shared customization schemes, and the like.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary scene customization system 100 ("system 100") that dynamically customizes a scene for presentation to a user. As shown, system 100 may include, without limitation, a management facility 102, a custom immersive scene generation facility 104, and a storage facility 106 selectively and communicatively coupled to one another. It will be recognized that although facilities 102 through 106 are shown to be separate facilities in FIG. 1, facilities 102 through 106 may be combined (e.g., combined into a single facility) or divided into more facilities in any way that may serve a particular implementation.

Management facility 102 may receive, generate, analyze, present and/or otherwise process data (e.g., data representative of user input, data stored in storage facility 106, data received or generated by management facility 102 itself, etc.) to facilitate the dynamic customization of a scene for presentation to a user in any way as may serve a particular implementation. For example, management facility 102 may detect a user selection of a customization scheme to be applied to an original immersive scene throughout a scene customization session by receiving and analyzing input provided by a user. As may be appropriate in a particular implementation, management facility 102 may also receive or generate data representative of an original immersive scene to which the selected customization scheme is to be applied. Examples of receiving and generating data representative of an original immersive scene will be described in more detail below. Management facility 102 may also present to the user (e.g., by way of an artificial reality device such as an immersive headset device or a mobile computing device) a custom immersive scene that is dynamically generated by custom immersive scene generation facility 104. Additionally, management facility 102 may perform various other operations as may serve a particular implementation of the systems and methods described herein.

Custom immersive scene generation facility 104 may generate a custom immersive scene based on an original immersive scene in any way described herein or as may serve a particular implementation. For example, custom immersive scene generation facility 104 may apply a customization scheme selected by a user (e.g., as detected by management facility 102) to an original immersive scene (e.g., generated or received by management facility 102) to generate the custom immersive scene, which may then be communicated back to management facility 102 (e.g., by way of storage facility 106) for presentation to the user. To generate the custom immersive scene, custom immersive scene generation facility 104 may receive data representative of the original immersive scene, develop a dynamic volumetric model of the original immersive scene, identify one or more objects in the dynamic volumetric model, and/or replace the one or more objects with one or more custom objects in any way described herein or as may serve a particular implementation.

In some examples, custom immersive scene generation facility 104 may perform these operations and/or various other operations that may serve a particular implementation in real time such that the user may be presented with a timely and up-to-date experience (e.g., an experience that correlates with events occurring in the scene actually surrounding the user). While data processing and data distribution may take a finite amount of time such that it may be impossible for a user to experience a custom immersive scene that is perfectly synchronized with the original immersive scene upon which the custom immersive scene is based, as used herein, operations are considered to be performed "in real time" when the operations are performed immediately and without undue delay. Accordingly, a user may be said to experience a custom immersive scene in real time even if the user experiences particular occurrences of the custom immersive scene a short time after the occurrences actually take place.

To support real-time dynamic volumetric modeling and experiencing of custom immersive scenes based on real-world original immersive scenes, custom immersive scene generation facility 104 may include or be implemented by any suitable configuration of hardware resources as may serve, in a particular implementation, to perform processing required for real-time creation and distribution of complex custom immersive scenes based on real-time data representative of dynamic volumetric models of original immersive scenes. For example, in certain implementations, the hardware resources may include multiple servers each including multiple parallel processing units. In other implementations, hardware resources for dynamically generating the custom immersive scene may be entirely integrated into an artificial reality device such as an immersive headset device, mobile computing device, or the like. Examples of the operations described above and/or various other operations that may be performed by custom immersive scene generation facility 104 will be described in more detail below.

Storage facility 106 may include and maintain any data received, generated, managed, maintained, processed, presented, or otherwise used by facilities 102 and 104 in a particular implementation. For example, as shown, storage facility 106 may include library data 108, which may include data related to one or more predefined and/or custom (e.g., user-defined) customization schemes, one or more preconfigured customizations that may be applied to known original immersive scenes, etc. For example, an artificial reality provider (e.g., a virtual reality content provider, an augmented reality content provider, etc.) may provide a library of various customization schemes such as those described herein. In some examples, customization schemes may also be user defined or user modified. For example, the library may include a generic or basic medieval customization scheme, as well as a custom medieval customization scheme in which a user has added additional elements (e.g., premiere elements for which the user has paid extra, custom elements that the user has designed or accessed independently of the provider, etc.).

Library data 108 may include various data associated with each customization scheme in the library. For example, each customization scheme may be associated with data representative of models of known objects and/or known object types that may be used to identify various objects in an original immersive scene and determine whether and how the original objects should be replaced by custom objects within the custom immersive scene. Each customization scheme may also include data representative of models of custom objects that may replace original objects in the custom immersive scene. For example, library data 108 may include a model of a known vehicle (e.g., a car of a particular make and model year) as well as a model of a custom vehicle (e.g., a vehicle that better matches the customization scheme) that is to replace the original vehicle in the custom immersive scene when the known vehicle is identified as part of the dynamic generation of the custom immersive scene by custom immersive scene generation facility 104. Library data 108 may also include any other data related to the customization scheme as may serve a particular implementation. For example, library data 108 may include data related to one or more preconfigured customizations to be applied to known real-world scenes, as will be described in more detail below.

As shown in FIG. 1, storage facility 106 may further include original immersive scene data 110 and custom immersive scene data 112. Original immersive scene data 110 may include data representative of an original immersive scene and may be received from scene capture devices (e.g., cameras, three-dimensional ("3D") depth modeling devices, etc.) that may be, for example, incorporated within management facility 102. For example, the scene capture devices may capture data representative of the location and the appearance of various objects within an original immersive scene surrounding the user, which may be used (e.g., by custom immersive scene generation facility 104) to generate a dynamic volumetric model of the original immersive scene that includes the various objects. Original immersive scene data 110 may include the raw data representative of the original immersive scene that is received, as well as data representative of the dynamic volumetric model of the original immersive scene as the dynamic volumetric model is developed (e.g., created or received and continually maintained and updated) by custom immersive scene generation facility 104. Original immersive scene data 110 may further include locational coordinates and/or other data related to known real-world scenes (e.g., the home or office of a user, or another real-world scene that the user may wish to customize in a particular way using preconfigured customizations such as art, design elements, etc.).

Similarly, custom immersive scene data 112 may include data representative of the custom immersive scene generated by applying a customization scheme and/or one or more preconfigured customizations to the original immersive scene. For example, custom immersive scene data 112 may include any data that may be used to replace original objects with custom objects within the dynamic volumetric model of the original immersive scene.

Figure 2:
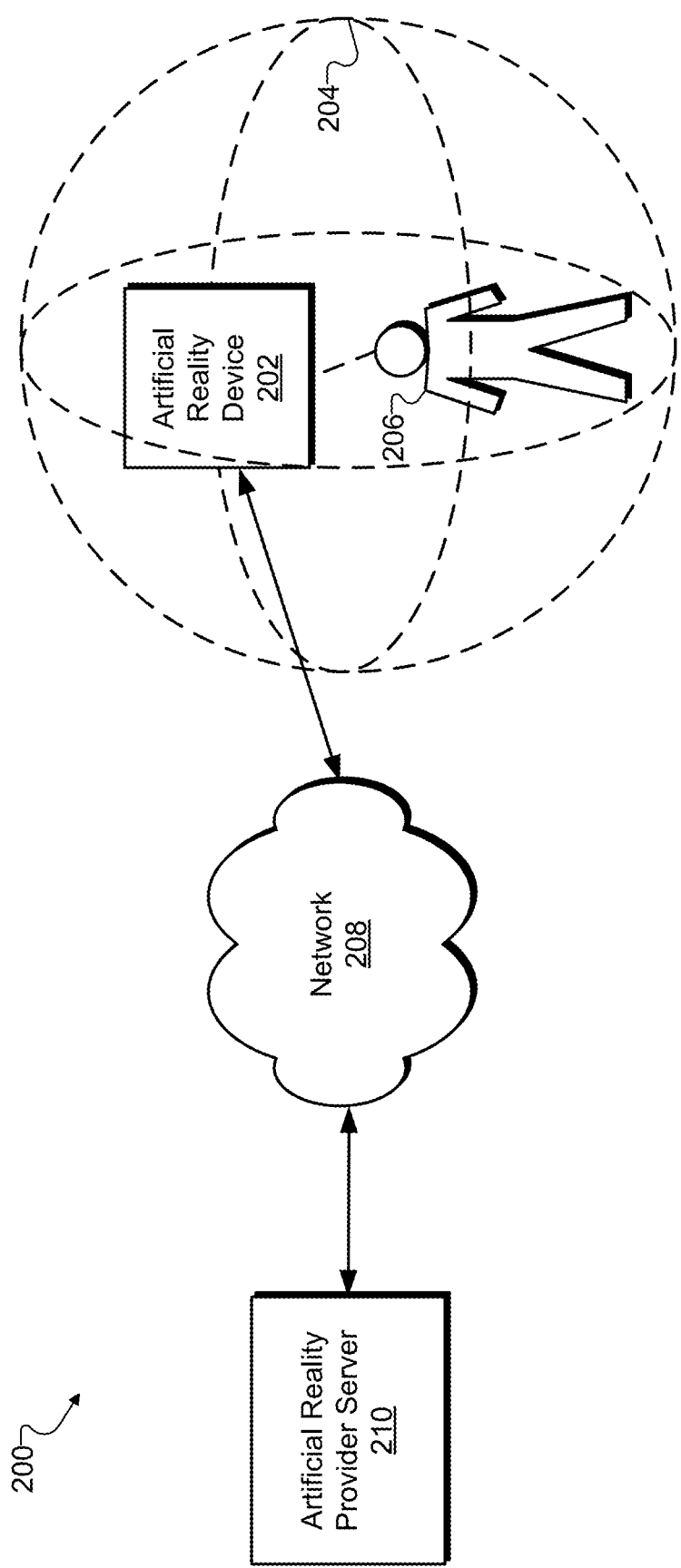
FIG. 2 illustrates an exemplary configuration in which an exemplary implementation of the scene customization system of FIG. 1 dynamically customizes an exemplary original immersive scene for presentation to an exemplary user according to principles described herein.

FIG. 2 illustrates an exemplary configuration 200 in which an exemplary implementation of system 100 dynamically customizes an exemplary original immersive scene for presentation to an exemplary user. As shown, configuration 200 includes an artificial reality device 202 included within a real-world scene 204. Artificial reality device 202 is associated with (e.g., being used by) a user 206 who is also located within real-world scene 204. Artificial reality device 202 is also communicatively coupled, through a network 208, with an artificial reality provider server 210 ("provider server 210"), which may be remote from artificial reality device 202 and user 206 (e.g., in a location distinct from real-world scene 204).

Configuration 200 may include an exemplary implementation of system 100 that may dynamically customize an original immersive scene for presentation to user 206. For example, system 100 may be implemented by hardware and/or software within artificial reality device 202, hardware and/or software within provider server 210, and/or hardware and/or software distributed across both artificial reality device 202 and provider server 210 and that communicates via network 208.

The implementation of system 100 in configuration 200 may be configured to dynamically customize an original immersive scene for presentation to user 206 as an augmented reality experience. Thus, as shown, the original immersive scene may include (e.g., may incorporate or be the same as) real-world scene 204 surrounding the user throughout a scene customization session. In configuration 200, system 100 may receive the data representative of the original immersive scene by, for example, directly capturing data representative of real-world scene 204 throughout the scene customization session. For example, artificial reality device 202 may include hardware components (e.g., one or more cameras, 3D depth modeling equipment, etc.) configured to directly capture the data representative of real-world scene 204 by, for instance, detecting light reflecting from surfaces of objects within real-world scene 204. In some examples, as will be described in more detail below, the data representative of real-world scene 204 surrounding the user (i.e., the data upon which the creating and the continually updating of the dynamic volumetric model may be based) may be captured exclusively by way of one or more sensors of artificial reality device 202 being used by user 206 to experience a scene customization session.

Based on the directly captured data (e.g., video captured by a camera included on artificial reality device 202, etc.), system 100 may develop a dynamic volumetric model of the original immersive scene in which user 206 is located (i.e., real-world scene 204). For example, system 100 may create and continually update a dynamic volumetric model of real-world scene 204 surrounding user 206 as data representative of real-world scene 204 continues to be directly captured by artificial reality device 202 throughout the scene customization session.

Once system 100 develops or begins developing (i.e., creating, updating, maintaining, etc.) the dynamic volumetric model of real-world scene 204, system 100 may identify and replace one or more objects within the dynamic volumetric model to generate a custom immersive scene. System 100 may also present the custom immersive scene to user 206, as will be described and illustrated in more detail below. Each of the elements depicted in FIG. 2 will now be described.

Artificial reality device 202 may include any of various types of devices used by user 206 to access and experience a custom immersive scene presented by system 100. As such, artificial reality device 202 may include or be implemented by any device capable of presenting a field of view of a custom immersive scene. For example, artificial reality device 202 may include or be implemented by an immersive headset device (e.g., a head-mounted virtual reality device, a head-mounted augmented reality device, a virtual reality gaming device, etc.), a personal computer device (e.g., a desktop computer, laptop computer, etc.), a mobile or wireless device (e.g., a smartphone, a tablet device, a mobile reader, etc.), or any other device or configuration of devices that may serve a particular implementation to facilitate receiving and/or presenting a custom immersive scene. Examples of various types of artificial reality devices that may implement artificial reality device 202 will be illustrated and described below. As will be described, different types of artificial reality devices may provide different types of artificial reality experiences and/or may provide different levels of immersiveness for user 202.

In configuration 200, real-world scene 204 may represent any real-world scenes described herein or any other suitable real-world scene. As shown, real-world scene 204 may be the scene or environment in which artificial reality device 202 and user 206 are located. As such, real-world scene 204 may change as artificial reality device 202 and/or user 206 move in the world. For example, real-world scene 204 may be the office of user 206 while user 206 is at work, the train and/or the real-world environment around the train as user 206 is commuting home from work, and the house of user 206 once user 206 arrives home. As mentioned above, in configuration 200, real-world scene 204 may include or constitute the original immersive scene upon which system 100 bases a dynamically generated custom immersive scene. In some examples, real-world scene 204 may be relatively small (e.g., including only a single room in which user 206 is located). In other examples, real-world scene 204 may be relatively large (e.g., including an entire office building in which user 206 may work, a large outdoor area in which user 206 is located, etc.).

Network 208 may include any provider-specific network (e.g., a cable or satellite carrier network or a mobile telephone network), the Internet, wide area network, or any other suitable network or series of networks. Data may flow between artificial reality device 202 and provider 210 by way of network 208 using any communication technologies, devices, media, and protocols as may serve a particular implementation. For example, artificial reality device 202 and provider server 210 may communicate with one another using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and/or other suitable communications technologies. While only one network 208 is shown to interconnect artificial reality device 202 and provider server 210 in configuration 200, it will be recognized that artificial reality device 202 and provider server 210 may intercommunicate by way of multiple interconnected wired or wireless networks as may serve a particular implementation.

Provider server 210 may include one or more servers or other computing devices associated with (e.g., provided and/or managed by) an artificial reality media content service provider (e.g., a network service provider, a cable service provider, a satellite service provider, an Internet service provider, a provider of artificial reality mobile applications, etc.). In some examples, provider server 210 may be included within system 100 and, as such, may perform or facilitate artificial reality device 202 in performing any of the operations described herein as being performed by system 100. For example, provider server 210 may communicate with artificial reality device 202 to receive data representative of real-world scene 204 and may include processing resources to develop or facilitate development of a dynamic volumetric model based on real-world scene 204. Provider server 210 may also include processing resources used to identify and replace objects within the dynamic volumetric model and/or to perform other operations for dynamically generating the custom immersive scene to be presented to user 206 by way of artificial reality device 202. In other examples, provider server 210 may be separate from (e.g., and communicatively coupled to) system 100, which may be implemented by artificial reality device 202 and may facilitate system 100 in dynamically customizing a scene for presentation to user 206 in any way as may serve a particular implementation. In yet other examples, provider server 210 may completely implement system 100 and may present the custom immersive scene to user 206 by providing data representative of the custom immersive scene to artificial reality device 202 for presentation to user 206.

Along with providing processing resources configured to, for example, dynamically generate a custom immersive scene to be presented to user 206, provider server 210 may also store, provide, and/or facilitate creation or modification of customization schemes that may be applied to real-world scene 204. For example, provider server 210 may store a library of predefined (e.g., provider defined) and/or user-defined customization schemes, along with data associated with the customization schemes as described herein (e.g., models of known objects, known object types, custom objects, etc.). Provider server 210 may also facilitate users in selecting, accessing, modifying, creating, or otherwise interacting with the customization schemes (e.g., by way of a user interface presented on artificial reality device 202).

Figure 3:
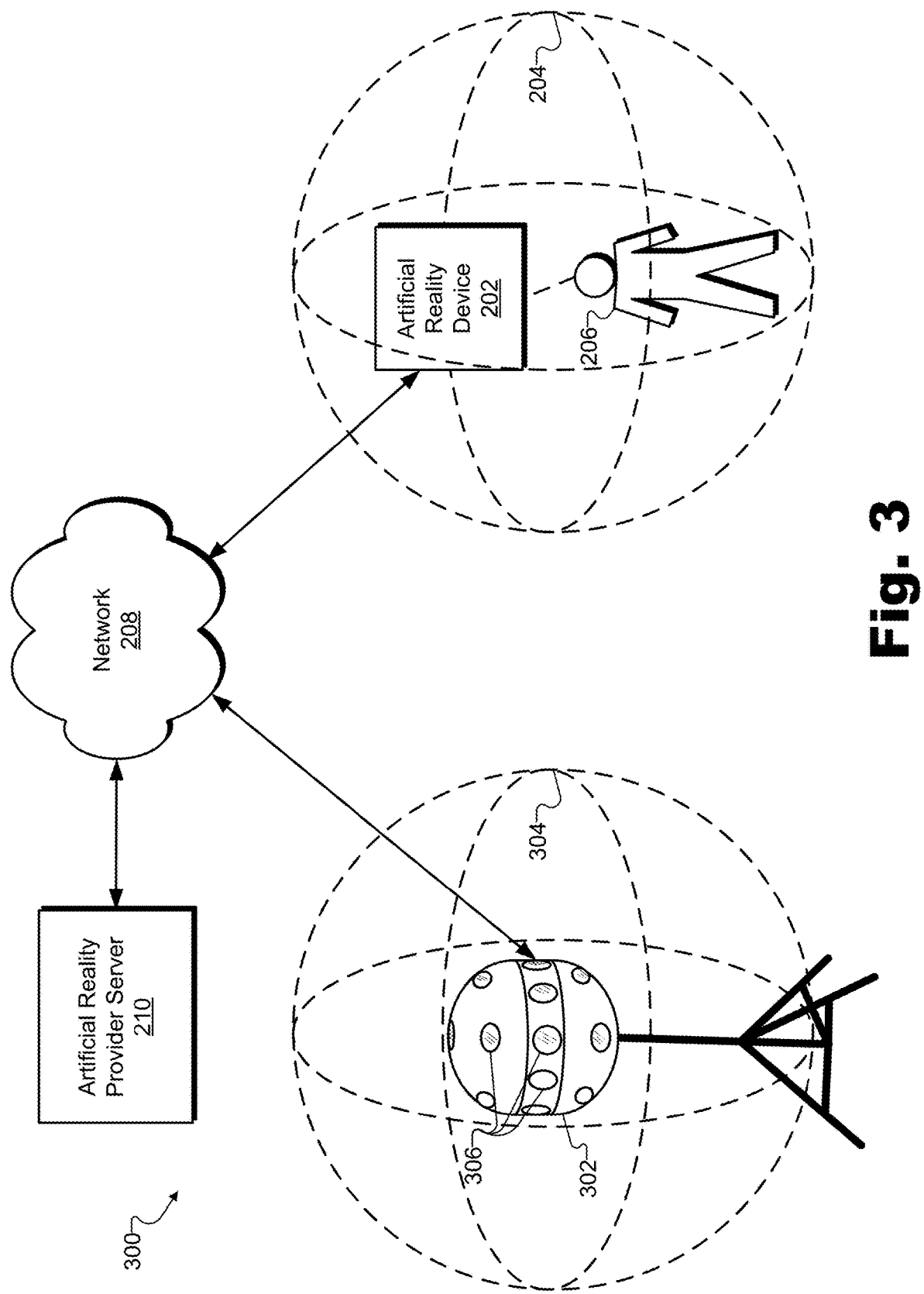
FIG. 3 illustrates another exemplary configuration in which an exemplary implementation of the scene customization system of FIG. 1 dynamically customizes an exemplary original immersive scene for presentation to an exemplary user according to principles described herein.

FIG. 3 illustrates an exemplary configuration 300 in which an exemplary implementation of system 100 dynamically customizes an exemplary original immersive scene for presentation to an exemplary user. Configuration 300 may include certain similarities with configuration 200 such as, for example, some of the same elements included within configuration 200 described above. For example, as shown, configuration 300 includes artificial reality device 202 included within real-world scene 204. As in configuration 200, artificial reality device 202 is associated with user 206 who is also located within real-world scene 204. Additionally, artificial reality device 202 is communicatively coupled, through network 208, with provider server 210, which may be remote from artificial reality device 202 and user 206 (e.g., in a location distinct from real-world scene 204).

Configuration 300 also includes certain differences from configuration 200. For example, as shown, configuration 300 includes a camera 302 located within a real-world scene 304, which may be distinct from (i.e., located in a different area than) real-world scene 204 surrounding user 206. As illustrated, camera 302 may be a 360° camera that includes a plurality of segment capture cameras 306 for capturing various segments of real-world scene 304 simultaneously to form a 360° camera image.

Like configuration 200, configuration 300 may include an exemplary implementation of system 100 that may dynamically customize an original immersive scene for presentation to user 206. For example, system 100 may be implemented by hardware and/or software within artificial reality device 202, hardware and/or software within provider server 210, and/or hardware and/or software distributed across both artificial reality device 202 and provider server 210 and that communicates via network 208. In certain embodiments, the implementation of system 100 may also include or be communicatively coupled with camera 302 (e.g., by way of network 208).

In contrast to configuration 200, in which the implementation of system 100 may be configured to present user 206 with an augmented reality experience, the implementation of system 100 shown configuration 300 may be configured to dynamically customize an original immersive scene for presentation to user 206 as a virtual reality experience. Thus, as shown, the original immersive scene may include (e.g., may incorporate or be the same as) real-world scene 304, which may be distinct from real-world scene 204 surrounding the user throughout a scene customization session. In other words, rather than experiencing a custom immersive scene based on the environment around him or her as provided by configuration 200, user 206 may experience a custom immersive scene based on a different real-world scene provided by a virtual reality provider. For example, while real-world scene 204 may be associated with a familiar location to user 206 (e.g., the home or workplace of user 206), real-world scene 304 may be associated with a real-world event (e.g., a concert, a sporting event, etc.), a fictionalized program (e.g., a virtual reality television show, etc.), an exotic location that may be difficult or expensive to reach (e.g., a different country, an undersea expedition, etc.), or another real-world scene that may be of interest to user 206. In some examples, the virtual reality experience provided by configuration 300 may include an artificially-generated scene in place of real-world scene 304, such that camera 302 may not be employed.

System 100 may receive data representative of the original immersive scene (i.e., real-world scene 304 rather than real-world scene 204) and develop the dynamic volumetric model of the original immersive scene differently in the virtual reality example of configuration 300 than described for the augmented reality example of configuration 200. Specifically, rather than receiving the data representative of the original immersive scene by, for example, directly capturing data representative of real-world scene 304 (which may be impossible because system 100 may not be located within real-world scene 304), system 100 may receive the data representative of the original immersive scene by receiving data transmitted by a scene modeling system having elements that are disposed in a vicinity of real-world scene 304 to capture data representative of real-world scene 304.

For example, a scene modeling system may include camera 302, as well as, potentially, one or more other cameras or other equipment (e.g., hardware, software, etc.) for capturing data representative of real-world scene 304 and/or for modeling real-world scene 304. Because the scene modeling system including camera 302 may be located in the vicinity of (e.g., within) real-world scene 304, components of the scene modeling system such as camera 302 may directly capture and transmit the data representative of real-world scene 304 (e.g., by way of network 208) to be received and processed by system 100 (e.g., by provider server 210 and/or by artificial reality device 202). As such, the implementation of system 100 in configuration 300 may develop the dynamic volumetric model of the original immersive scene (i.e., of real-world scene 304) differently than the implementation of system 100 in configuration 200. Specifically, rather than creating and continually updating the dynamic volumetric model, system 100 in configuration 300 may receive data representative of the dynamic volumetric model of real-world scene 304 (e.g., as part of the received data transmitted by the scene modeling system). For example, the data representative of the dynamic volumetric model of real-world scene 304 may be created by the scene modeling system (e.g., based on data directly captured by camera 302 and that is representative of real-world scene 304). System 100 may also continually update the received dynamic volumetric model of real-world scene 304 based on the received data transmitted by the scene modeling system as the data transmitted by the scene modeling system continues to be transmitted and received (e.g., as camera 302 continues to capture data representative of real-world scene 304).

As in configuration 200, once the implementation of system 100 in configuration 300 develops or begins developing (i.e., receiving, updating, maintaining, etc.) the dynamic volumetric model of real-world scene 304, system 100 may identify and replace one or more objects within the dynamic volumetric model to generate a custom immersive scene. System 100 may also present the custom immersive scene to user 206 by way of artificial reality device 202. Artificial reality device 202, real-world scene 204, network 208, and provider server 210 were described above in relation to configuration 200 and, in some examples, may perform similar or identical functions in configuration 300 as may serve to implement the virtual reality functionality of configuration 300 described above. In other examples, artificial reality device 202 may be a different type of artificial reality device (e.g., an artificial reality device more specifically adapted to providing virtual reality experiences rather than augmented reality experiences). Additionally, provider server 210 may perform additional functionality to implement the virtual reality experience provided by configuration 300 that may not be performed for the augmented reality experience provided by configuration 200. Specifically, provider server 210 may include, implement, or operate in conjunction with the scene modeling system described above (i.e., that includes camera 302 and is used to capture data representative of real-world scene 304) to capture, create, and/or distribute the dynamic volumetric model of real-world scene 304.

The scene modeling system that includes camera 302 may capture data representative of real-world scene 304 and create a dynamic volumetric model of real-world scene 304 in any suitable way. For example, the scene modeling system may include one or more cameras (i.e., including camera 302) and/or other equipment disposed within or around real-world scene 304 and configured to capture data representative of objects within real-world scene 304 (e.g., depth data, texture data, color data, and/or other data used for 3D modeling of the objects). In certain implementations, the scene modeling system may capture data and/or create a dynamic volumetric model of real-world scene 304 in any of the ways described in co-pending U.S. patent application Ser. No. 15/141,707, filed Apr. 28, 2016, and entitled METHODS AND SYSTEMS FOR CREATING AND PROVIDING A VOLUMETRIC REPRESENTATION OF A REAL-WORLD EVENT and/or co-pending U.S. patent application Ser. No. 15/141,717, filed Apr. 28, 2016, and entitled METHODS AND SYSTEMS FOR CREATING AND MANIPULATING AN INDIVIDUALLY-MANIPULABLE VOLUMETRIC MODEL OF AN OBJECT. The content of both of these applications is hereby incorporated by reference in its entirety.

For example, as shown in FIG. 3, 360° camera 302 may capture and/or generate a 360° video instance (e.g., video file, video stream, etc.) of real-world scene 304 around a center point corresponding to camera 302. Camera 302 may capture a plurality of images from each of the plurality of segment capture cameras 306 built into or otherwise associated with camera 302, and may generate the 360° video instance of scene 304 by stitching together the images captured by segment-capture cameras 306 or, alternatively, by transmitting the images to a system configured to stitch the images together to form the 360° video instance (e.g., the scene modeling system, provider server 210, etc.). To this end, each segment capture camera 306 may capture a respective portion (or segment) of real-world scene 304 such that each of the portions at least partially overlaps with at least one other portion to cover some or all of real-world scene 304. 360° video instances and/or dynamic volumetric models generated using data received from camera 302 and/or other cameras or equipment associated with a scene modeling system may be used to generate virtual reality media content in any way as may serve a particular implementation.

Figure 4:
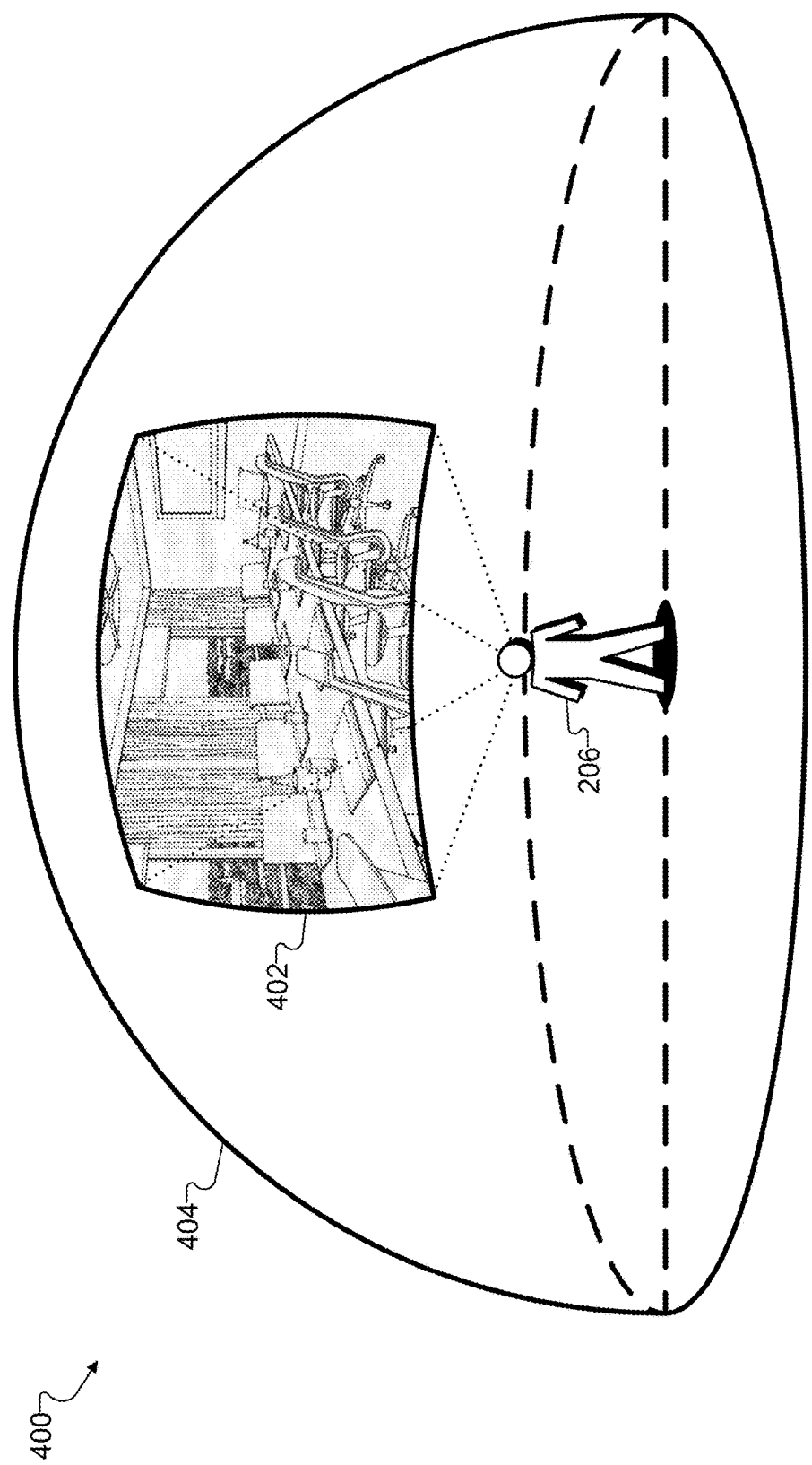
FIG. 4 illustrates an exemplary artificial reality experience in which a user is presented with an exemplary field of view of an exemplary immersive scene according to principles described herein.

FIG. 4 illustrates an exemplary artificial reality experience 400 in which user 206 is presented with an exemplary field of view 402 of an exemplary immersive scene 404. For example, experience 400 may be an augmented reality experience (e.g., provided by an implementation of system 100 such as that illustrated in configuration 200 of FIG. 2), a virtual reality experience (e.g., provided by an implementation of system 100 such as that illustrated in configuration 300 of FIG. 3), or any other suitable type of experience whereby an immersive scene (e.g., an original or a custom immersive scene based on a real-world or artificially-generated scene) is presented to user 206 by way of an artificial reality device.

User 206 may experience immersive scene 404 by providing user input to dynamically change field of view 402 to display whatever content within immersive scene 404 that user 206 wishes to view. For example, the user input provided by user 206 may include an indication that user 206 wishes to look at part of immersive scene 404 that is not currently presented within field of view 402. For an artificial reality device such as a personal computer and/or a mobile computing device, this user input may include a mouse movement, navigation key input from a keyboard, a swipe gesture, or the like. For an artificial reality device incorporating particular sensors (e.g., motion sensors, directional sensors, orientation sensors, etc.) such as an immersive headset device, however, this user input may include a change to an orientation of the display screen of the artificial reality device with respect to at least one axis of at least two orthogonal axes. For example, the artificial reality device may be configured to sense changes in orientation of the display screen with respect to an x-axis, a y-axis, and a z-axis that are all orthogonal to one another. As such, the artificial reality device being used by user 206 to experience artificial reality experience 400 may be configured to detect the change to the orientation of the display screen as user 206 experiences immersive scene 404, and the dynamic changing of the content includes gradually replacing one part of immersive scene 404 with another part of immersive scene 404 that is determined to be visible from a viewpoint of user 206 within immersive scene 404 according to the detected change to the orientation of the display screen with respect to the at least one axis.

To illustrate, FIG. 4 shows that immersive scene 404 may be a real-world scene that includes a conference room in an office setting. User 206 may provide user input to the artificial reality device by which user 206 is experiencing immersive scene 404 (e.g., artificial reality device 202) to indicate that user 206 wishes to look to the left of what is currently included within field of view 402. For example, user 206 may press a left navigation key on a keyboard, perform a swipe gesture to the right, or change the orientation of the display screen with respect to a y-axis by rotating his or her head to the left while wearing an immersive headset device. In response, the objects currently visible within immersive scene 404 (e.g., the conference table, the chairs, the windows, etc.) may scroll to the right across field of view 402 to give user 206 a sensation that he or she is turning to look to the left in immersive scene 404. As objects within immersive scene scroll off the right side of field of view 402, new objects (e.g., objects not shown in FIG. 4) may smoothly scroll onto the left side of field of view 402. In this way, user 206 may provide user input to cause field of view 402 to present any part of immersive scene 404 that user 206 desires.

In certain examples, field of view 402 may be presented entirely on an opaque display screen of an artificial reality device such as, for example, a typical display screen of a mobile computing device, laptop, tablet, or other suitable artificial reality device commonly used to present not only artificial reality experiences but also to present non-artificial reality applications. For instance, if system 100 is presenting a virtual reality experience to user 206, a field of view of an immersive scene associated with a real-world scene distinct from the real-world scene surrounding user 206 or an artificially-generated scene may fill an entirety of the opaque display screen of the artificial reality device. Similarly, if system 100 is presenting an augmented reality experience to user 206, a pass-through camera (e.g., positioned behind the opaque screen of the artificial reality device) may be used to detect and present a field of view of the real-world scene surrounding user 206.

In other examples, field of view 402 may be presented on a screen that is (or may be made to be) at least partially transparent such as, for example, a display screen of certain artificial reality devices specially configured for augmented reality-type applications. For instance, if system 100 is presenting an augmented reality experience to user 206, certain objects (e.g., objects in an original immersive scene, objects that are not replaced by custom objects in a custom immersive scene, etc.) may be directly visible to user 206 due to a direct passage of light (i.e., light reflecting from the objects) through the partially transparent screen to the eyes of user 206. At the same time, other objects (e.g., virtual objects, objects that are replaced by custom objects in a custom immersive scene, etc.) may appear to be located at various locations within immersive scene 404 such as by being projecting onto the partially transparent screen, being projected onto the retina of user 206 (e.g., by way of a laser waveguide), and/or in any other way as may serve a particular implementation.

The elements illustrated in FIG. 4 are exemplary only. For example, it will be understood that, while immersive scene 404 is illustrated in FIG. 4 as a semi-sphere (e.g., indicating that user 206 may look in any direction that is substantially forward, backward, left, right, and/or up), in certain implementations, immersive scene 404 may include an entire 360° by 180° sphere (e.g., so that user 206 may direct field of view 402 in any direction within immersive scene 404 including down) and/or may be implemented using non-spherical shapes such as cubes, rectangular prisms, pyramids, and/or other geometric structures that may serve a particular implementation.

Figure 5:
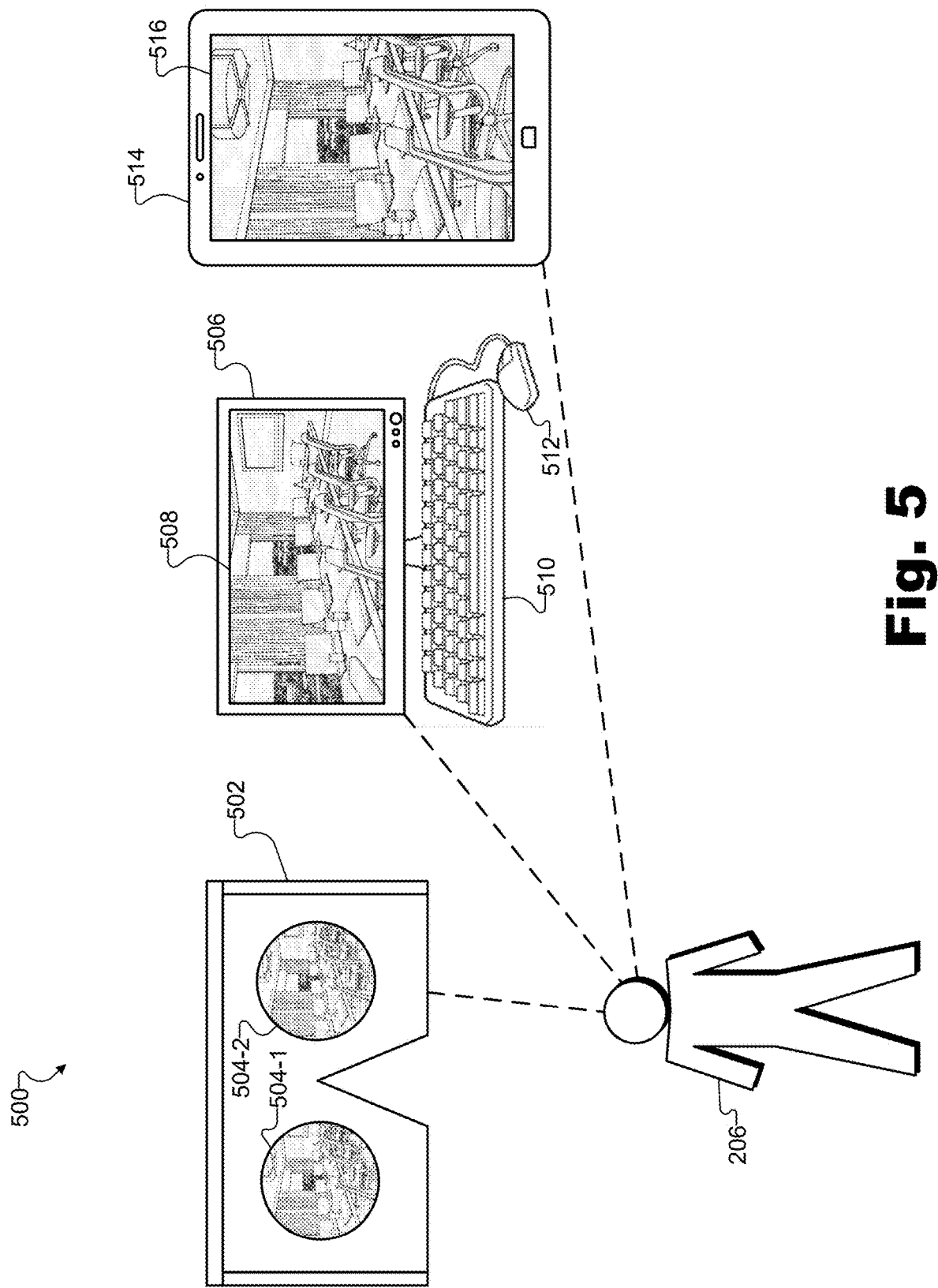
FIG. 5 illustrates exemplary artificial reality devices configured to facilitate a user in experiencing the exemplary immersive scene of FIG. 4 according to principles described herein.

Different types of artificial reality devices may provide different experiences for user 206 by presenting field of view 402 of immersive scene 404 in different ways and/or by receiving user input from user 206 in different ways. To illustrate, FIG. 5 illustrates various exemplary artificial reality devices 500 configured to facilitate user 206 in experiencing immersive scene 404. Any of artificial reality devices 500 or other suitable artificial reality devices operating using similar principles described for artificial reality devices 500 may be used to implement artificial reality device 202, described above.

As one example of an artificial reality device, an immersive headset device 502 (e.g., a head-mounted virtual or augmented reality device) may be mounted on the head of user 206 and arranged so that each of the eyes of user 206 sees a distinct display screen 504 (e.g., display screens 504-1 and 504-2) within immersive headset device 502. In some examples, a single display screen 504 may be presented and shared by both eyes of user 206. For example, a single, partially-transparent display screen (e.g., an augmented reality visor) may be used. In other examples, as shown, distinct display screens 504 (e.g., opaque or partially transparent display screens) within immersive headset device 502 may be configured to display slightly different versions of field of view 402 (e.g., stereoscopic versions of field of view 402 that may be captured by one or more stereoscopic cameras) to give user 206 the sense that immersive scene 404 is three-dimensional. Regardless of whether display screens 504 are opaque or partially transparent, display screens 504 may be configured to fill the peripheral vision of user 206, providing a sense of realism to user 206.

Moreover, immersive headset device 502 may include motion sensors (e.g., accelerometers), directional sensors (e.g., magnetometers), orientation sensors (e.g., gyroscopes), and/or other suitable sensors to detect natural movements (e.g., head movements) of user 206 as user 206 experiences immersive scene 404. Thus, user 206 may provide input indicative of a desire to move field of view 402 in a certain direction and by a certain amount in immersive scene 404 by simply turning his or her head in that direction and by that amount. As such, immersive headset device 502 may provide user 206 with a natural and hands-free experience that does not require any physical console control to experience the custom immersive scene and that may be the most immersive artificial reality experience provided by any type of artificial reality device.

As another example of an artificial reality device, a personal computer device 506 (e.g., a desktop computer, a laptop computer, etc.) having a display screen 508 (e.g., a monitor) may be used by user 206 to experience immersive scene 404. Because display screen 508 may not provide the distinct stereoscopic view for each of the user's eyes and/or may not fill the user's peripheral vision, personal computer device 506 may not provide the same degree of immersiveness that immersive headset device 502 provides. However, personal computer device 506 may be associated with other advantages such as its ubiquity among casual artificial reality users that may not be inclined to purchase or use an immersive headset device. In some examples, personal computer device 506 may allow a user to experience artificial reality content (e.g., virtual reality content) within a standard web browser so that user 206 may conveniently experience immersive scene 404 without using special devices or downloading special software. User 206 may provide user input to personal computer device 506 by way of a keyboard 510 (e.g., using navigation keys on keyboard 510 to move field of view 402) and/or by way of a mouse 512 (e.g., by moving mouse 512 to move field of view 402). In certain examples, a combination of keyboard 510 and mouse 512 may be used to provide user input such as by moving field of view 402 by way of navigation keys on keyboard 510 and clicking or otherwise interacting with objects within immersive scene 404 by way of mouse 512.

As yet another example of an artificial reality device, a mobile computing device 514 (e.g., a smartphone, a tablet computer, a mobile reading device, etc.) having a display screen 516 may be used by user 206 to experience immersive scene 404. Mobile computing device 514 may incorporate certain advantages of both immersive headset devices and personal computer devices to provide the most versatile type of artificial reality device for experiencing immersive scene 404. Specifically, like personal computer devices, mobile devices are extremely ubiquitous, potentially providing access to many more people than dedicated immersive headset devices. However, because many mobile devices are equipped with motion sensors, directional sensors, orientation sensors, etc., mobile devices may also be configured to provide user 206 with an immersive experience comparable to that provided by immersive headset devices. For example, mobile computing device 514 may be configured to divide display screen 516 into two versions (e.g., stereoscopic versions) of field of view 402 and to fill the peripheral vision of user 206 when mobile computing device 514 is mounted to the head of user 206 using a relatively inexpensive and commercially-available mounting apparatus (e.g., a cardboard apparatus). In other embodiments, mobile computing device 514 may facilitate experiencing immersive scene 404 by receiving movement-based user input at arm's length (i.e., not mounted to the head of user 206 but acting as a hand-held dynamic window for looking around immersive scene 404), by receiving swipe gestures on a touchscreen, or by other techniques that may serve a particular embodiment.

While examples of certain artificial reality devices have been described, the examples are illustrative and not limiting. An artificial reality device may include any suitable device and/or configuration of devices configured to facilitate receipt and presentation of custom immersive scenes according to principles described herein. For example, an artificial reality device may include a tethered device configuration (e.g., a tethered headset device) or an untethered device configuration (e.g., a display screen untethered from a processing device). As another example, an immersive headset device or other artificial reality device may be used in conjunction with a controller such as a wearable controller (e.g., a ring controller) and/or a handheld controller.

An extended example will now be described to illustrate how system 100 may dynamically customize a scene for presentation to a user by, for example, receiving data representative of a particular original immersive scene, developing a dynamic volumetric model of the original immersive scene based on the data, and identifying and replacing objects within the dynamic volumetric model. The example will be described with respect to FIGS. 6-9B.

Figure 6:
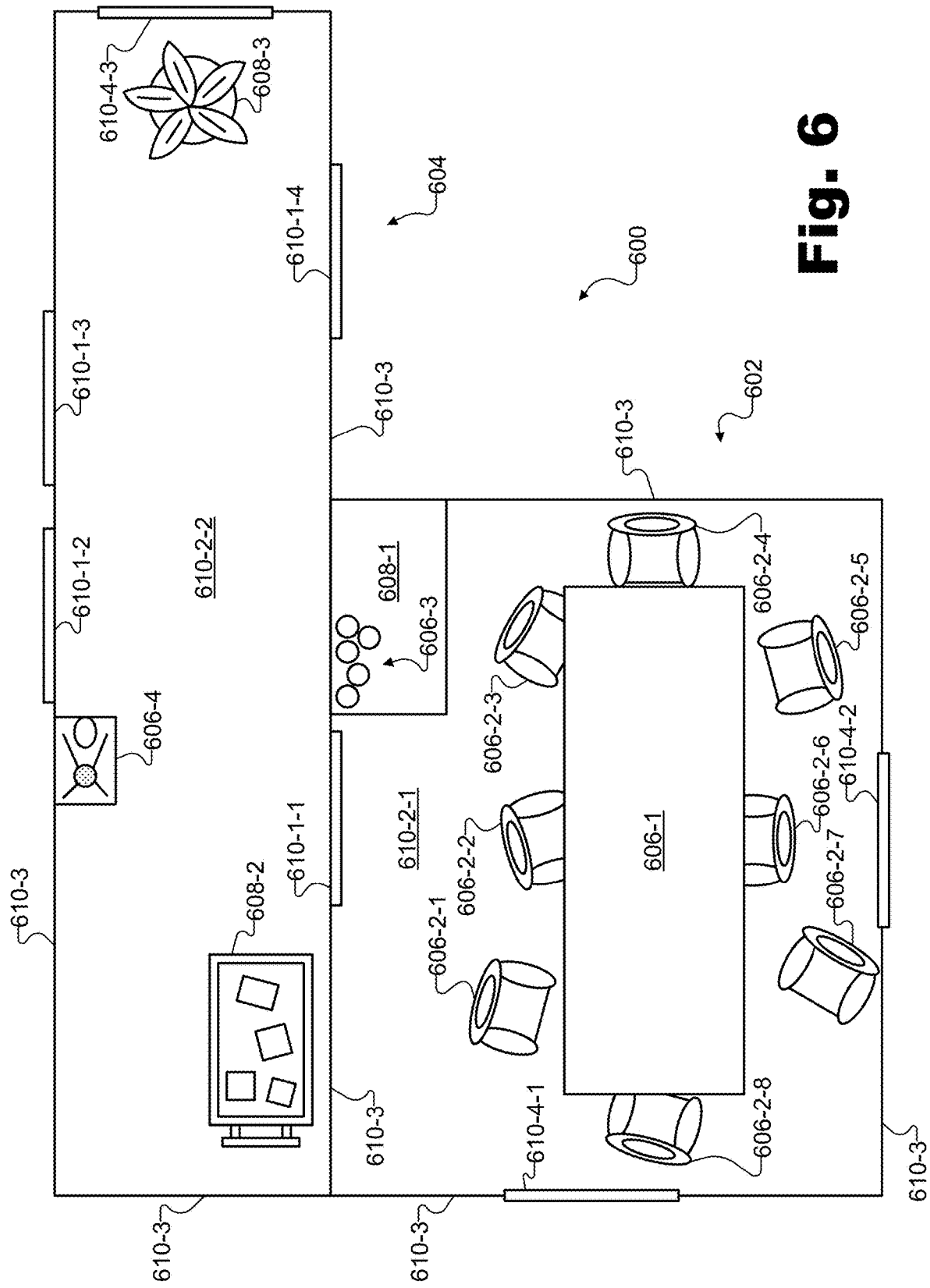
FIG. 6 illustrates exemplary objects within an exemplary original immersive scene that may be dynamically customized by the scene customization system of FIG. 1 according to principles described herein.

FIG. 6 illustrates various exemplary objects within an exemplary original immersive scene 600 that may be dynamically customized by system 100. Certain objects labeled and described in relation to FIG. 6 are also included in FIGS. 7A-9B. However, it is noted that the objects described and labeled in FIG. 6 may not be explicitly labeled in FIGS. 7A-9B in order to eliminate clutter and for the sake of clarity in the description of these other figures. It will be understood that all objects within original immersive scene 600 that will be referred to in the description of any of FIGS. 6-9B are illustrated, labeled, and described in relation to FIG. 6.

Specifically, as shown in FIG. 6, original immersive scene 600 may be a real-world scene in an office setting. Original immersive scene 600 includes a conference room 602 and a hallway 604, illustrated, in FIG. 6, from a top, cutaway view. Because of doors that may be shut, etc., only objects that are included within conference room 602 and/or hallway 604 may be included (e.g., described, represented within dynamic volumetric models, etc.) in the examples of FIGS. 6-9B. As a result, only conference room 602, hallway 604, and objects included therein are illustrated and labeled in original immersive scene 600 in FIG. 6. It will be understood, however, that similar principles may be used to continue to extend dynamic volumetric models and to otherwise dynamically customize a scene for presentation to a user when the user moves from conference room 602 or hallway 604 to other original immersive scenes (e.g., to other rooms within the office setting, to the world outside the office building, etc.).

The objects in original immersive scene 600 may fall into at least one of three categories of objects, based upon whether and/or to what extent the objects may be "known" to system 100 (e.g., identifiable, based on object recognition techniques and the like, by system 100).

As a first category of objects, original immersive scene 600 may include various known objects 606 for which system 100 may access predefined data. For example, system 100 may include (e.g., within storage facility 106) or otherwise have access (e.g., by way of another system or a commercial database) to data such as 3D models, pictures, physical description data, and/or other suitable data representative of known objects 606 to facilitate system 100 in identifying known objects 606 with particularity, as will be described in more detail below. For example, as shown, known objects 606 may include a particular conference table 606-1 (e.g., a conference table of a certain brand and model for which system 100 may access data), particular office chairs 606-2 (i.e., office chairs 606-2-1 through 606-2-8, which may all be of a same brand and model for which system 100 may access data), beverages 606-3 (e.g., one or more cans of soda for which system 100 may access data), and water fountain 606-4 (e.g., a particular brand and model of water fountain for which system 100 may access data).

As a second category of objects, original immersive scene 600 may include various unknown objects 608 of unknown object types. System 100 may not have access to predefined data describing certain unknown objects 608 and may not be configured to otherwise identify the unknown objects 608 based on a known object type (in contrast with the third category of objects described below). As such, system 100 may not identify unknown objects 608 and, thus, may not replace unknown objects 608 with custom objects in the dynamic volumetric model upon which the custom immersive scene is based. Additionally, or alternatively, system 100 may have access to predefined data describing certain unknown objects 608 and/or may be configured to identify the unknown objects 608 based on a known object type, but may still abstain from replacing the unknown objects 608 with custom objects due to the presence of the unknown objects 608 on a predefined non-augmentable object list or because a particular customization scheme does not include a custom object suitable for replacing the unknown objects, as will be described below. As shown in FIG. 6, unknown objects 608 within original immersive scene 600 may include a supply counter 608-1 (e.g., a counter upon which beverages 606-3 may be made available and which may contain office supplies for convenience of meeting attendees in conference room 602), a mail cart 608-2 (e.g., used by aides to transport items throughout the office place), and a plant 608-3 (e.g., a decoration located at one end of hallway 604).

As a third category of objects, original immersive scene 600 may include various unknown objects of known object types, referred to herein as "recognized objects" 610. In contrast to known objects 606, system 100 may not have access to predefined data allowing system 100 to identify recognized objects 610 with particularity (e.g., based on a particular brand of the object, model of the object, etc.). However, in contrast to certain unknown objects 608, system 100 may be configured to identify recognized objects 610 based on known object types having characteristics for which system 100 can access data. For example, basic characteristics such as a location, an orientation, a size, a color, a texture, and/or other suitable characteristics may indicate to system 100 that an object is of a known object type (e.g., a flooring object type, a wall object type, a window object type, a ceiling object type, a rectangular structure object type, a paved road object type, etc.). Consequently, system 100 may identify recognized objects 610 such that system 100 may replace recognized objects 610 within the dynamic volumetric model, as will be described below, even if recognized objects 610 may not be known and identified with particularity. As shown in FIG. 6, recognized objects 610 within original immersive scene 600 may include various doors 610-1 (i.e., door 610-1-1 between conference room 602 and hallway 604, and other doors 610-1-2 through 610-1-4), flooring 610-2 (i.e., flooring 610-2-1 of conference room 602 and flooring 610-2-2 of hallway 604), various walls 610-3 of both conference room 602 and hallway 604, and various windows 610-4 (i.e., windows 610-4-1 and 610-4-2 within conference room 602 and window 610-4-3 in hallway 604).

Figure 7A:
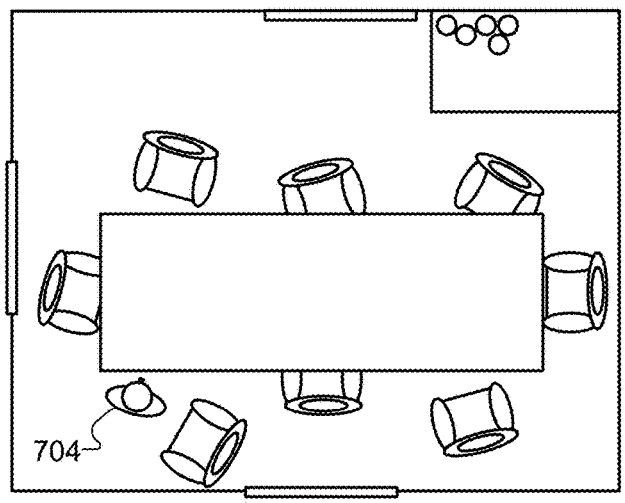
FIG. 7A illustrates exemplary elements of an exemplary dynamic volumetric model of the original immersive scene of FIG. 6 according to principles described herein.
Figure 7B:
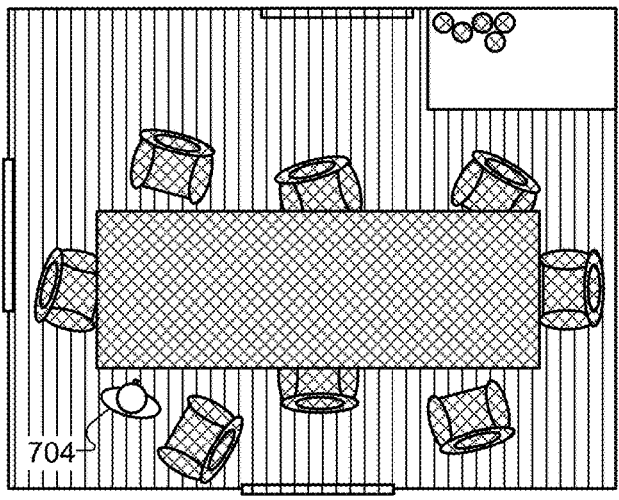
FIG. 7B illustrates exemplary elements of a custom immersive scene dynamically generated based on the dynamic volumetric model of FIG. 7A according to principles described herein.

To illustrate how system 100 may dynamically customize original immersive scene 600 for presentation to a user, FIG. 7A illustrates exemplary elements of an exemplary dynamic volumetric model 700 of original immersive scene 600 and FIG. 7B illustrates exemplary elements of a custom immersive scene 702 dynamically generated based on dynamic volumetric model 700.

A user 704 may be located in conference room 602 with the door to the conference room (i.e., door 610-1-1) shut. In this example, user 704 may wish to experience a scene customization session by way of an artificial reality device that user 704 is using (not explicitly shown). In particular, user 704 may wish to customize the real-world scene surrounding user 704 in a customized augmented reality experience based on a particular customization scheme such as a medieval customization scheme. Accordingly, user 704 may select the medieval customization scheme (e.g., using a user interface provided by the artificial reality device being used by user 704) to begin a scene customization session in which the medieval customization scheme is to be applied to original immersive scene 600.

System 100 (e.g., which may be implemented by the artificial reality device, by another device such as a provider server, or by both, as described above in relation to FIG. 2) may detect the selection by user 704 of the medieval customization session. In response, system 100 may initiate a scene customization session in which the medieval customization scheme is applied to original immersive scene 600 to dynamically generate custom immersive scene 702, which may be presented to user 704 by way of the artificial reality device throughout the scene customization session. For example, system 100 may receive data representative of original immersive scene 600, develop (e.g., based on the received data representative of original immersive scene 600) dynamic volumetric model 700 of original immersive scene 600, identify (e.g., within dynamic volumetric model 700) one or more objects included in original immersive scene 600 (e.g., known objects 606, recognized objects 610, etc.), and replace (e.g., within dynamic volumetric model 700) the one or more objects with one or more custom objects in accordance with the medieval customization scheme selected by user 704.

System 100 may receive data representative of original immersive scene 600 and develop dynamic volumetric model 700 based on the received data in any way as may serve a particular implementation. For example, as mentioned above, and as will be illustrated in more detail below, system 100 may use sensors (e.g., cameras, depth sensors, etc.) included on the artificial reality device being used by user 704 to scan and/or otherwise capture data about objects within original immersive scene 600. In some examples, for instance, system 100 may receive three-dimensional positional data for various objects in original immersive scene 600 as well as texture data (e.g., color data, video data, etc.) for the various objects. Based on the received data, system 100 may begin to model and map a 3D depth map (i.e., similar to a wireframe model) of the objects based on the 3D positional data and may overlay the texture data onto the 3D depth map to create 3D volumetric models of the various objects within original immersive scene 600. As shown in FIG. 7A, for example, system 100 may develop dynamic volumetric model 700 of original immersive scene 600 to include conference room 602 and various objects therein (e.g., conference table 606-1, office chairs 606-2, supply counter 608-1, door 610-1-1, flooring 610-2, etc.).

Because door 610-1-1 is currently shut, system 100 may be currently unable to detect data representative of hallway 604 to begin integrating objects within hallway 604 into dynamic volumetric model 700. As will be described in more detail below, system 100 may begin to model hallway 604 and the objects therein once door 610-1-1 is opened (e.g., so that user 704 may see out into hallway 604), or may already be modeled or partially modeled by system 100 based on modeling of hallway 604 performed previously. Additional description of how dynamic volumetric model 700 may be developed will be provided below with respect to FIGS. 8A-9B.

System 100 may identify one or more objects within original immersive scene 600 (e.g., one or more of known objects 606, recognized objects 610, etc.) in any way as may serve a particular implementation. For example, system 100 may identify, based on the received data representative of original immersive scene 600 (e.g., data captured or received by the artificial reality device associated with user 704 and/or incorporated within dynamic volumetric model 700), one or more features of a particular object included in the one or more objects. For example, system 100 may identify one or more predefined markers or unique features (e.g., styles, corners, sizes, proportions, colors, special marks, etc.) of conference table 606-1. System 100 may match the one or more features of the particular object (e.g., conference table 606-1) with one or more corresponding features of a known object (e.g., the brand and model of conference table 606-1) documented in an object library associated with the selected customization scheme. Based on the matching of the one or more features, system 100 may determine that the particular object is an instance of the known object documented in the object library. For example, based on the style, size, dimensions, color, special markings, and/or other characteristics of conference table 606-1, system 100 may determine that conference table 606-1 is an instance of a particular brand and model of conference table included in the object library of objects "known" to system 100.

Additionally or alternatively, system 100 may identify, based on the received data representative of original immersive scene 600, one or more features of a particular object included in the one or more objects such as, for example, flooring 610-2-1. For example, system 100 may identify one or more features of flooring 610-2-1 such as the carpeted texture, the relatively large size of the floor (i.e., covering the whole room), the position of the floor with respect to other objects (i.e., running horizontally underneath other objects), and the like. As a result, system 100 may determine that these features of the particular object (i.e., flooring 610-2-1) are characteristic of a known object type documented in an object library associated with the selected customization scheme (e.g., a flooring object type). Based on the determination that one or more features of flooring 610-2-1 are characteristic of the flooring object type, system 100 may determine that the flooring 610-2-1 is of the flooring object type. In other words, system 100 may "recognize" flooring 610-2-1 as being the floor of conference room 602.

In some examples, as described above, system 100 may perform object recognition operations automatically to identify known objects (e.g., such as conference table 606-1) and/or recognized objects (e.g., such as flooring 610-2-1). In other examples, however, manual human assistance (e.g., from user 704, from a technician responsible for modeling the office space, etc.) may be used to facilitate object identification within a particular dynamic volumetric model such as dynamic volumetric model 700.

Custom immersive scene 702, represented in FIG. 7B, may be dynamically generated based on dynamic volumetric model 700 in any way as may serve a particular implementation. For example, system 100 may replace one or more objects identified in dynamic volumetric model 700 with one or more custom objects in accordance with the selected customization scheme (e.g., the medieval customization scheme being applied). The replacing of original objects with custom objects by system 100 may be performed in any way as may serve a particular implementation. For example, the replacing of original objects with custom objects may be performed in any of the ways described in co-pending U.S. patent application Ser. No. 15/141,717, the contents of which were incorporated by reference above, and/or by any of the other ways described herein. Additionally, in some implementations, the replacing of original objects with custom objects may be performed differently based on what category the identified objects fall into.

As one example, replacing a particular known object may include replacing the particular object determined to be the instance of the known object with a particular custom object that is predetermined, within the selected customization scheme, to correspond to the known object. To illustrate, one particular known object may be conference table 606-1, which, as described in the example above, system 100 may have determined to be an instance of a known brand and model of conference table for which a predetermined custom object is assigned within the medieval customization scheme. For instance, this particular brand and model of conference table may correspond, within the customization scheme, with a long, rugged table that appears to be made of rough wooden slats bound by rusted iron cross strapping. As a result, system 100 may, as part of the dynamic generation of custom immersive scene 702, replace conference table 606-1 with the custom rugged table defined in the medieval customization scheme. For example, as illustrated in custom immersive scene 702 by cross-hatched shading, various known objects (e.g., conference table 606-1, office chairs 606-2, beverages 606-3, etc.) within original immersive scene 600 may be replaced by specific custom objects in accordance with the medieval customization scheme. For example, along with the rugged table replacing conference table 606-1, office chairs 606-2 may be replaced by sturdy wood and iron chairs and beverages 606-4 may be replaced by rustic goblets containing various colors of liquids.

As another example, replacing an unknown object of a known object type (e.g., one of recognized objects 610) may include replacing the recognized object determined to be of the known object type with a particular custom object that is predetermined, within the selected customization scheme, to correspond to the known object type. To illustrate, one particular known object may be flooring 610-2-1, which, as described in the example above, system 100 may have determined to be of the flooring object type for which a predetermined custom object is assigned within the medieval customization scheme. For instance, objects of the flooring object type may correspond, within the customization scheme, with flooring formed from large tiles appearing to be made from stone. As a result, system 100 may, as part of the dynamic generation of custom immersive scene 702, replace flooring 610-2-1 with the stone flooring defined in the medieval customization scheme. For example, as illustrated in custom immersive scene 702 by vertical lined shading, various recognized objects (e.g., flooring 610-2-1, door 610-1-1, windows 610-4-1 and 610-4-2, walls 610-3, etc.) within original immersive scene 600 may be replaced by custom objects in accordance with the medieval customization scheme. For example, along with the stone flooring replacing flooring 610-2-1, walls 610-3 (as well as the ceiling of conference room 602, not shown) may be replaced by stone walls, door 610-1-1 may be replaced by a rugged door composed of wooden slats and iron cross strapping, and windows 610-4-1 and 610-4-2 may be replaced by views of a beautiful countryside outside of the stony castle walls.

As mentioned above, certain unknown objects (e.g., objects 608) within original immersive scene 600 may not be replaced during the dynamic generation of custom immersive scene 702. For example, certain objects within original immersive scene 600 such as supply counter 608-1 may be unknown objects that are also of an unknown object type such that system 100 may be unable to identify the objects.

In other examples, system 100 may identify (e.g., within dynamic volumetric model 700 of original immersive scene 600) one or more "non-augmentable objects" included in original immersive scene 600. The one or more non-augmentable objects may correspond with predefined entries on a non-augmentable object list associated with the selected customization scheme. For example, it may be desirable (e.g., based on preferences of user 704, based on safety regulations, based on privacy concerns, etc.) for certain objects to not be replaced, augmented, or otherwise customized. Traffic lights and/or other road indicators, for instance, may not fit with a medieval customization scheme, but may be left unaltered for safety reasons. As a result, system 100 may abstain from replacing the one or more non-augmentable objects with the one or more custom objects.

In still other examples, system 100 may identify one or more known or recognized objects within original immersive scene 600, but the known or recognized objects may not correspond with any custom object within the customization scheme. As a result, the known or recognized objects may be treated like unknown objects and may not be replaced in custom immersive scene 702.

As shown in FIG. 7B, unknown objects or other objects not replaced within custom immersive scene 702 are illustrated without shading to indicate that the objects remain unaltered (e.g., such as supply counter 608-1). In certain examples, system 100 may perform a total scene replacement in which every object or every known or recognized object not included on a non-augmentable object list is replaced within a custom immersive scene to provide the most immersive artificial reality experience possible. In other examples, system 100 may perform only a partial scene replacement in which a single object or a subset of objects within an original immersive scene are replaced within the custom immersive scene to provide a less immersive artificial reality experience that is more familiar and similar to the real world.

In certain examples, an original immersive scene may be modeled by a system other than system 100. For example, in implementations involving virtual reality experiences, an original immersive scene may be modeled by a scene modeling system and the model sent to system 100, or the original immersive scene may be artificially generated rather than being a real-world scene. Similarly, in implementations involving augmented reality experiences, an original immersive scene may be pre-scanned and a volumetric model pre-generated before a scene customization session is initiated.

In other examples, however, dynamic volumetric model 700 may be developed incrementally and/or in real time as sensors (e.g., sensors of the artificial reality device used by user 704) capture data representative of new regions of original immersive scene 600 that have not previously been captured and/or integrated into dynamic volumetric model 700. For example, in certain examples, the data representative of a real-world scene surrounding a user (e.g., original immersive scene 600 surrounding user 704) may be captured in real time exclusively by way of one or more sensors of the artificial reality device used by the user to experience the scene customization session.

System 100 may incrementally develop dynamic volumetric model 700 in any suitable way. For example, system 100 may employ a simultaneous localization and mapping algorithm to block out areas of original immersive scene 600 as user 704 encounters them. Volumetric data (e.g., 3D depth data, etc.) may be captured exclusively by the sensors of the artificial reality device even in spite of the fact that the artificial reality device may not be able to capture data related to all sides of particular objects at once. For example, the artificial reality device may include stereoscopic cameras configured to facilitate depth capture of objects being modeled. Additionally or alternatively, the artificial reality device may be configured to use a wobble on a single camera and/or the fact that one or more cameras or other devices are being repositioned at new locations and at new angles with respect to the objects being modeled (e.g., as user 704 moves around within original immersive scene 600) to facilitate the depth capture and otherwise develop the dynamic volumetric model.

Figure 8A:
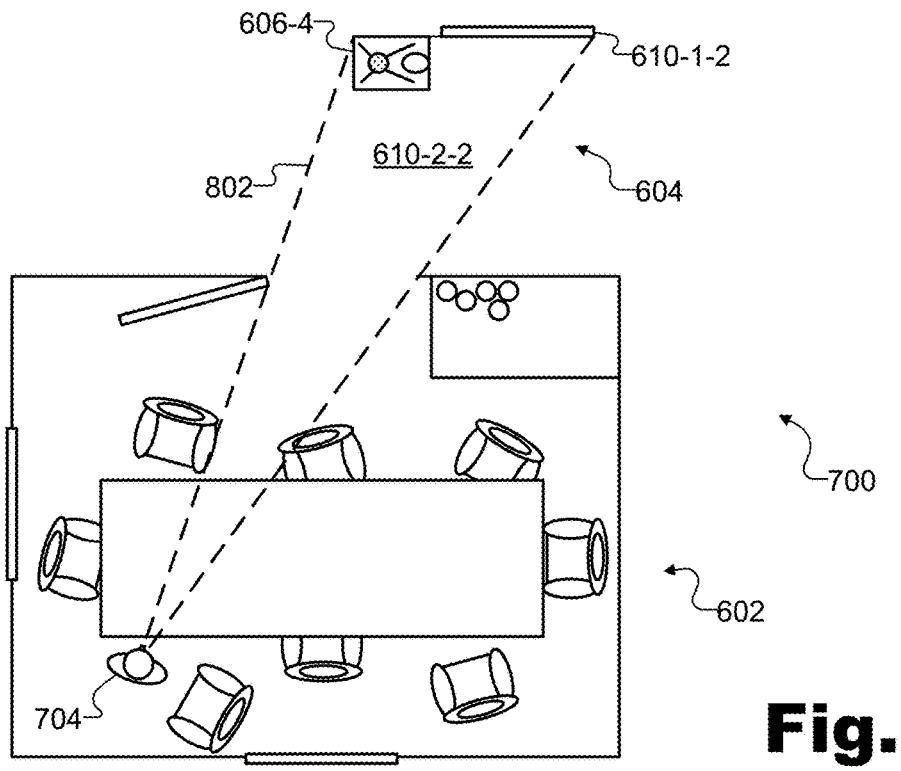
FIG. 8A illustrates additional exemplary elements of the dynamic volumetric model of FIG. 7A according to principles described herein.

To illustrate, FIG. 8A shows additional exemplary elements of dynamic volumetric model 700 that may be added to dynamic volumetric model 700 incrementally as user 704 and the artificial reality device being used by user 704 encounter (perceive, detect, etc.) new regions of original immersive scene 600. Specifically, as shown in FIG. 8A, when door 610-1-1 is opened to reveal a region of hallway 604, a viewable region 802 that user 704 and his or her artificial reality device are able to perceive or detect may extend through the door and into part of hallway 604. Accordingly, as shown, a portion of flooring 610-2-2 (i.e., the flooring in hallway 604), water fountain 606-4, and door 610-1-2 may be added to dynamic volumetric model 700.

Figure 8B:
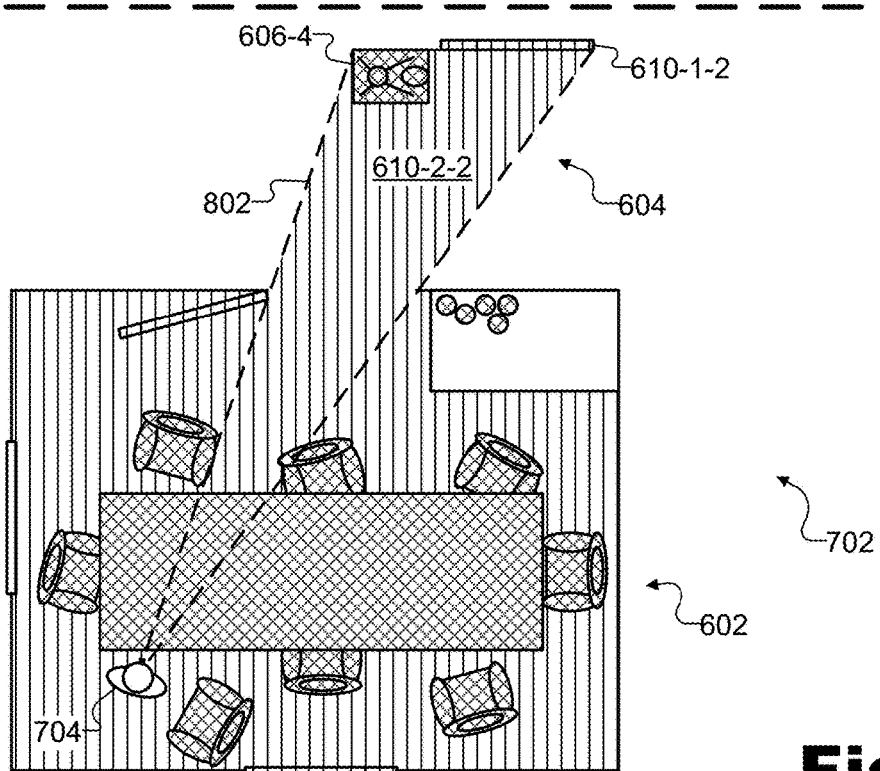
FIG. 8B illustrates additional exemplary elements of the custom immersive scene dynamically generated based on the dynamic volumetric model of FIG. 8A according to principles described herein.

In accordance with the incremental development of dynamic volumetric model 700, custom immersive scene 702 may also be dynamically generated and updated. For example, FIG. 8B illustrates additional exemplary elements of custom immersive scene 702 dynamically generated based on the updated dynamic volumetric model 700 shown in FIG. 8A. Specifically, the portion of flooring 610-2-2 may be recognized to be of the flooring object type such that the stony floor may be made to appear to continue from conference room 602 out into hallway 604. Similarly, door 610-1-2 may be replaced by a similar custom door as replaced door 610-1-1 or by a different custom door. For example, door 610-1-2 may be to a men's restroom, which system 100 may determine based on a restroom symbol on the door. Accordingly, a special door corresponding to men's restrooms within the medieval customization scheme (e.g., including a themed symbol indicative of the room) may be used to replace door 610-1-2. Because water fountain 606-4 may be a known object, system 100 may similarly replace water fountain 606-4 with another custom object more in line with the medieval customization scheme in custom immersive scene 702.

To further illustrate the incremental development of dynamic volumetric model 700, FIG. 9A illustrates even more elements that may be added to dynamic volumetric model 700 when user 704 leaves conference room 602 and enters hallway 604. As shown in FIG. 9A, after user 704 has viewed all around conference room 602 and hallway 604, all of the objects of original immersive scene 600 described above in relation to FIG. 6 may be added to dynamic volumetric model 700. Specifically, as shown, dynamic volumetric model 700 may be developed to include the entirety of flooring 610-2-2, mail cart 608-2, plant 608-3, window 610-4-3, doors 610-1-3 and 610-1-4, and various additional walls 610-3.

As in FIG. 8B, custom immersive scene 702 may also be dynamically generated and updated in accordance with the incremental development of dynamic volumetric model 700. To illustrate, FIG. 9B shows additional exemplary elements of custom immersive scene 702 dynamically generated based on the updated dynamic volumetric model 700 shown in FIG. 9A. For example, custom stone flooring and walls may replace flooring 610-2-2 and walls 610-3 in the hallway, appropriate doors may replace doors 610-1-3 and 610-1-4 (e.g., including a special women's restroom door for door 610-1-3), and a countryside view may replace window 610-4-3. Since plant 608-3 and mail cart 608-2 are unknown objects, plant 608-3 and mail cart 608-2 may not be replaced by system 100 (i.e., as indicated by the lack of shading in FIG. 9B).

In certain examples, system 100 may determine that an original immersive scene includes a known real-world scene documented in a scene library associated with the selected customization scheme. As a result, system 100 may dynamically generate a custom immersive scene based on the application of the selected customization scheme to the original immersive scene by customizing an original immersive scene according to at least one preconfigured customization documented within the scene library in association with the known real-world scene.

For example, if user 704 goes to the office that includes original immersive scene 600 every day, system 100 may determine (e.g., when user 704 causes his or her artificial reality device to initiate a new scene customization session)

that original immersive scene 600 is documented in a scene library associated with the customization scheme selected by user 704. Within the scene library, various preconfigured customizations may be described, detailed, or otherwise documented to cause original immersive scene 600 to be customized in a particular way. For example, user 704 may create (e.g., by documenting within the scene library associated with the known real-world scene of original immersive scene 600) preconfigured customizations corresponding to particular elements of original immersive scene 600. For example, while most of the walls and floors within the office space of original immersive scene 600 may be stone walls, user 704 may create a preconfigured customization for the walls and floor of his or her own office to make those walls and floor to appear to be plated with gold. Similarly, while most office chairs may be replaced with rugged chairs of wood and iron as described above, user 704 may create a preconfigured customization to make a particular chair (e.g., a chair in his or her office) appear to be a jewel-encrusted golden throne.

Users may also use preconfigured customizations to implement other examples described herein. For example, a user may use a preconfigured customization to place a particular piece of art in a particular location within his or her home, to designate a particular table to display on its surface a daily news feed, to change a design of a particular building, or to otherwise modify or customize any particular object that the user repeatedly encounters in his or her life.

System 100 may identify a particular object for which a preconfigured customization is assigned in any suitable way. For example, system 100 may use location sensors (e.g., GPS sensors), pedometers, accelerometers, compasses, and/or any other suitable sensors to determine what real-world scene (or what part of a real-world scene) a user is viewing so that it may be determined if any preconfigured customizations are to be applied to objects within the real-world scene.

Figure 10:
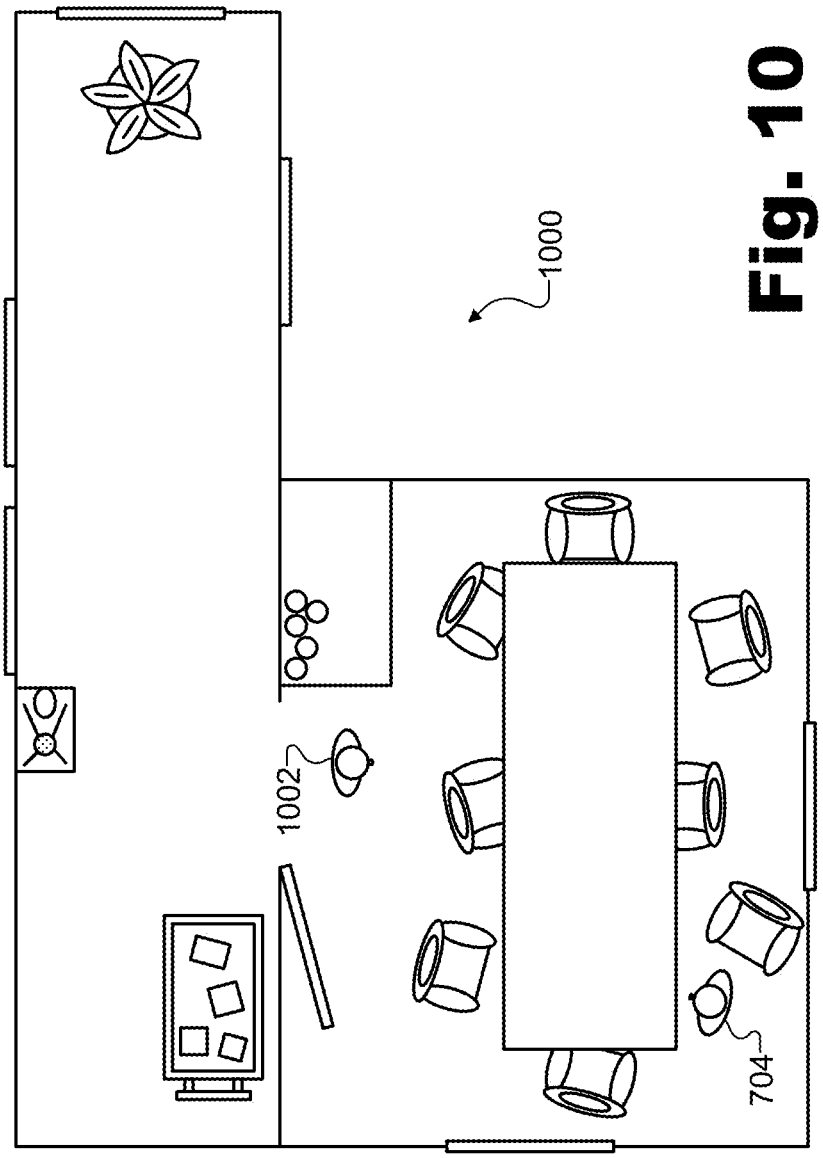
FIG. 10 illustrates a scenario in which a plurality of users experiences the original immersive scene of FIG. 6 according to principles described herein.

In some examples, one user may share a customization scheme with another user so that both users may experience the same custom immersive scene together. To illustrate, FIG. 10 shows a scenario 1000 in which a plurality of users experiences original immersive scene 600 together. For example, as shown in FIG. 10, user 704 may be located within conference room 602 and may be experiencing a scene customization session in which the medieval customization scheme is applied to original immersive scene 600. While the scene customization session is ongoing, a user 1002 (e.g., another person with another artificial reality device) may enter original immersive scene 600 (i.e., by walking into conference room 602, as shown). As a result, the system 100 being used by user 704 (e.g., including the artificial reality device used by user 704) may determine that user 1002 is experiencing (e.g., present within) original immersive scene 600. This system 100 may provide (e.g., to another system 100 being used by user 1002 and in response to the determining that user 1002 has entered original immersive scene 600) data representative of a custom immersive scene being presented to user 704 (e.g., custom immersive scene 700).

The data representative of the custom immersive scene may be configured to facilitate another dynamic generation of the custom immersive scene and another presentation of the custom immersive scene to user 1002 by way of the artificial reality device being used by user 1002. For example, if the artificial reality device of user 704 has selected a medieval customization scheme to provide an augmented reality experience, this artificial reality device may detect the presence of the artificial reality device of user 1002 and transmit data representative of the medieval customization scheme to the artificial reality device of user 1002 to invite user 1002 to experience custom immersive scene 702 in the same way the user 704 is experiencing custom immersive scene 702. User 1002 may select to accept an invitation to experience custom immersive scene 702 along with user 704 and both users may be presented with custom immersive scene 702 such that both users appear to one another to be located within the medieval reality.

Alternatively, user 1002 may decline the invitation to experience custom immersive scene 702 with user 704 and, instead, may initiate a scene customization session in which a different customization scheme (e.g., a futuristic customization scheme) is applied to original immersive scene 600. Accordingly, user 1002 may appear, to user 704, to be located within a medieval world, while user 704 may simultaneously appear, to user 1002, to be located within a futuristic world, even though both users 704 and 1002 are actually located in conference room 602 in the real-world office scene of original immersive scene 600.

System 100 may provide the data representative of the custom immersive scene being presented to user 704 in any way as may serve a particular implementation. For example, as described above, system 100 may send an invitation for user 1002 to apply the same customization scheme that user 704 is applying. More specifically, system 100 may automatically generate a "friend list" in which users detected to be in the vicinity of user 704 are populated such that user 704 may select particular users to send invitations to. In other examples, various users may "enter" a custom immersive scene associated with a particular customization scheme by signing in to the scene customization session in a way that is analogous to conference call participants calling into a virtual conference room. In still other examples, data associated with a first custom immersive scene experienced by a first user such as user 704 (e.g., data representative of a dynamic volumetric model and/or associated with original or custom objects that may be replaced within the dynamic volumetric model during a scene customization session of the first user) may be shared with a second user such as user 1004. In this way, for example, a second custom immersive scene based on the first custom immersive scene may be generated and experienced by the second user.

Figure 11:
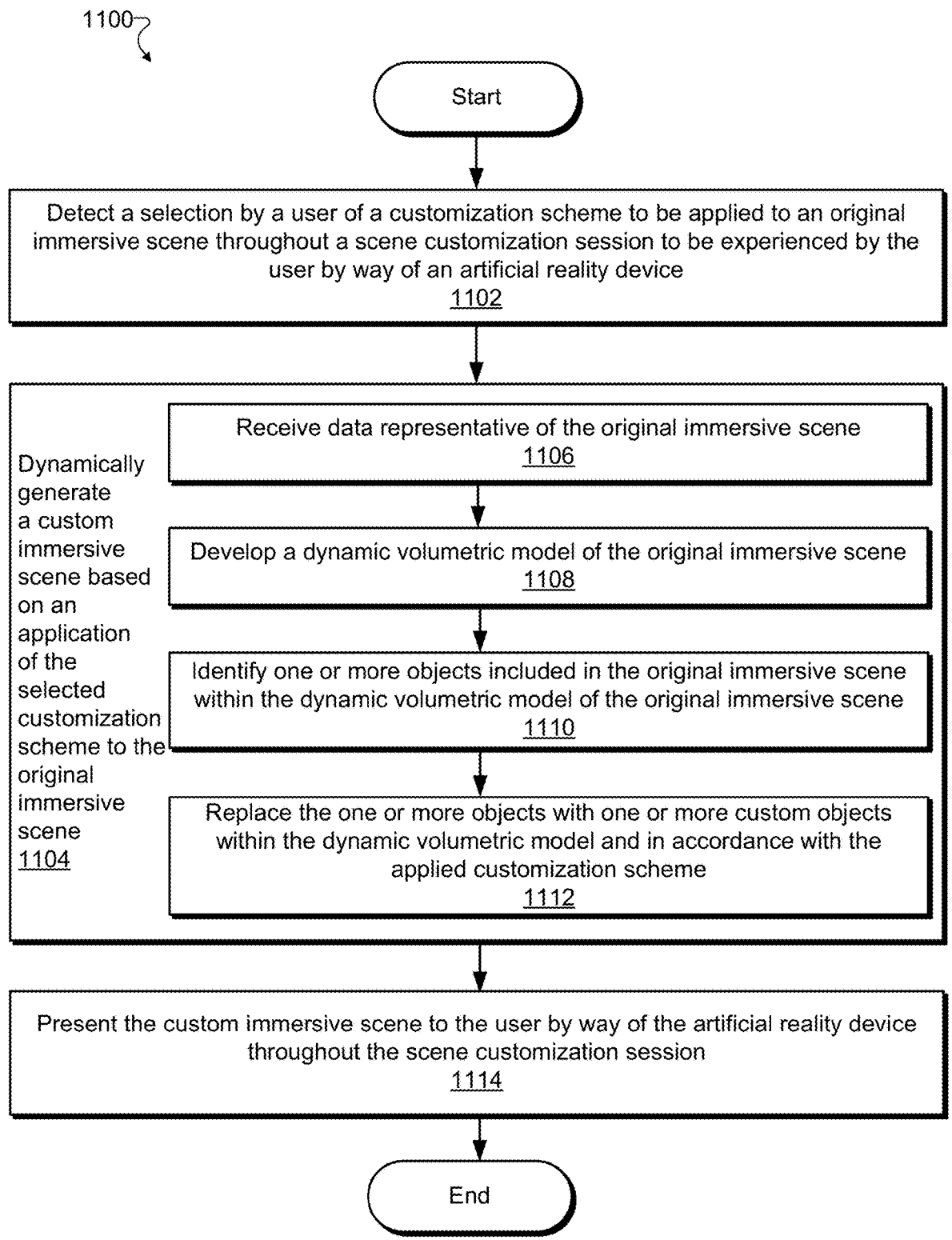
FIG. 11 illustrates an exemplary method for dynamically customizing a scene for presentation to a user according to principles described herein.

FIG. 11 illustrates an exemplary method 1100 for dynamically customizing a scene for presentation to a user. While FIG. 11 illustrates exemplary operations according to one embodiment, other embodiments may omit, add to, reorder, and/or modify any of the operations shown in FIG. 11. One or more of the operations shown in FIG. 11 may be performed by system 100 and/or any implementation thereof.

In operation 1102, a scene customization system may detect a selection, by a user, of a customization scheme to be applied to an original immersive scene throughout a scene customization session to be experienced by the user by way of an artificial reality device. Operation 1102 may be performed in any of the ways described herein.

In operation 1104, the scene customization system may dynamically generate a custom immersive scene based on an application of the selected customization scheme (i.e., the customization scheme detected to be selected by the user in operation 1102) to the original immersive scene. Operation 1104 may be performed in any of the ways described herein. For example, as illustrated in FIG. 11, operation 1104 may be performed by the scene customization system performing operations 1106 through 1112, described below. In some implementations, operation 1104 may be performed continuously by, for example, the scene customization system continually and/or repeatedly performing operations 1106 through 1112.

In operation 1106, the scene customization system may receive data representative of the original immersive scene. Operation 1106 may be performed in any of the ways described herein.

In operation 1108, the scene customization system may develop a dynamic volumetric model of the original immersive scene based on the received data representative of the original immersive scene. Operation 1108 may be performed in any of the ways described herein.

In operation 1110, the scene customization system may identify one or more objects included in the original immersive scene. For example, the scene customization system may identify one or more objects within the dynamic volumetric model of the original immersive scene. Operation 1110 may be performed in any of the ways described herein.

In operation 1112, the scene customization system may replace the one or more objects identified in operation 1110 with one or more custom objects. Operation 1112 may be performed in any of the ways described herein. For example, the scene customization system may replace the one or more objects within the dynamic volumetric model and in accordance with the applied customization scheme.

In operation 1114, the scene customization system may present the custom immersive scene to the user by way of the artificial reality device. For example, the scene customization system may present the custom immersive scene throughout the scene customization session. Operation 1114 may be performed in any of the ways described herein.

Figure 12:
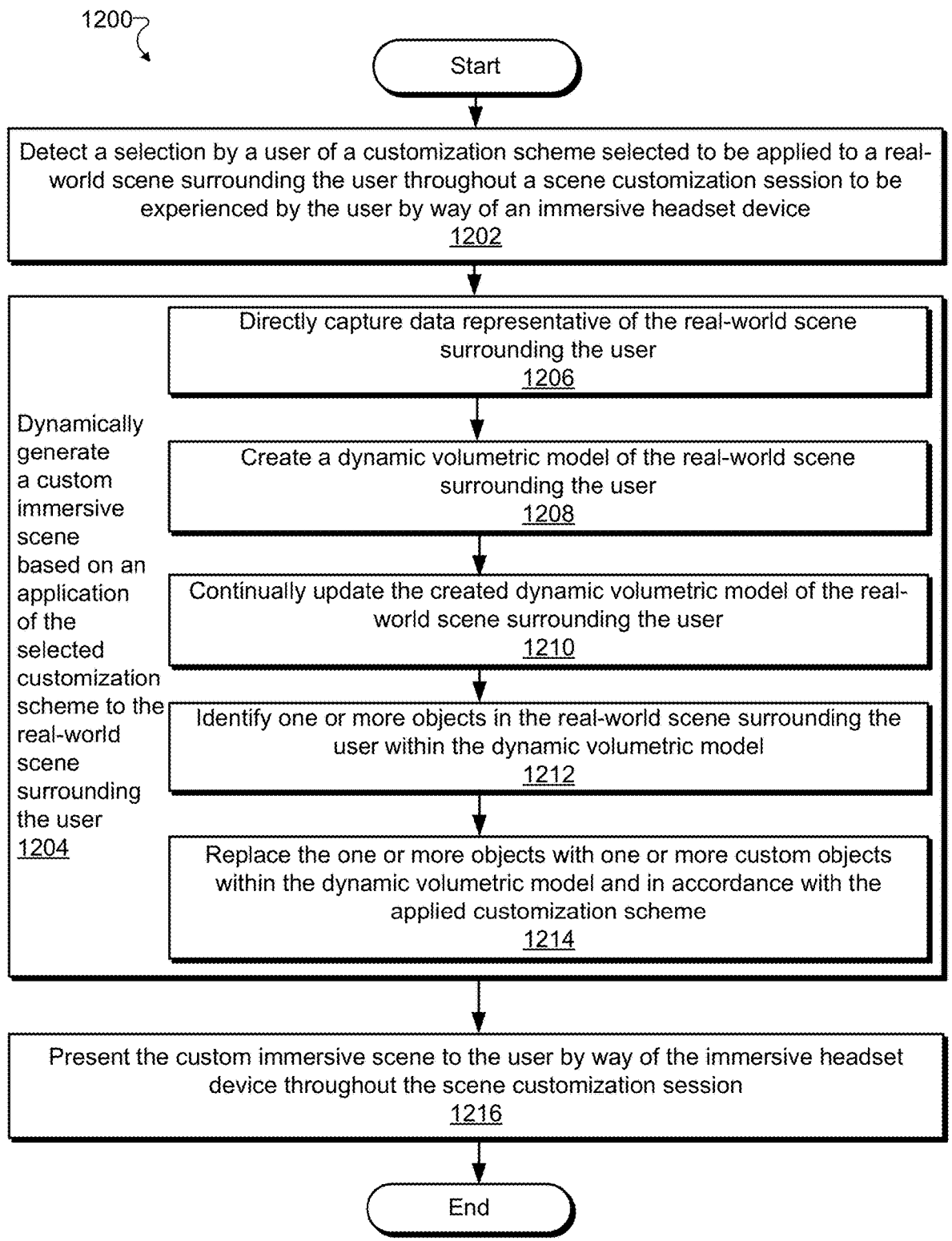
FIG. 12 illustrates another exemplary method for dynamically customizing a scene for presentation to a user according to principles described herein.

FIG. 12 illustrates an exemplary method 1200 for dynamically customizing a scene for presentation to a user. While FIG. 12 illustrates exemplary operations according to one embodiment, other embodiments may omit, add to, reorder, and/or modify any of the operations shown in FIG. 12. One or more of the operations shown in FIG. 12 may be performed by system 100 and/or any implementation thereof.

In operation 1202, a scene customization system may detect a selection, by a user, of a customization scheme from a library of customization schemes provided by an augmented reality provider associated with the scene customization system. In some examples, the customization scheme may be selected to be applied to a real-world scene surrounding the user throughout a scene customization session to be experienced by the user by way of an immersive headset device. Operation 1202 may be performed in any of the ways described herein.

In operation 1204, the scene customization system may dynamically generate a custom immersive scene based on an application of the selected customization scheme to the real-world scene surrounding the user. Operation 1204 may be performed in any of the ways described herein. For example, as illustrated in FIG. 12, operation 1204 may be performed by performing operations 1206 through 1214, described below. In some implementations, operation 1204 may be performed continuously by, for example, continually and/or repeatedly performing operations 1206 through 1214.

In operation 1206, the scene customization system may directly capture data representative of the real-world scene surrounding the user. Operation 1206 may be performed in any of the ways described herein. For example, the scene customization system may directly capture the data throughout the scene customization session.

In operation 1208, the scene customization system may create a dynamic volumetric model of the real-world scene surrounding the user. Operation 1208 may be performed in any of the ways described herein. For example, the scene customization system may create the dynamic volumetric model based on the directly captured data representative of the real-world scene surrounding the user.

In operation 1210, the scene customization system may continually update the dynamic volumetric model of the real-world scene surrounding the user (e.g., the dynamic volumetric model created in operation 1208). Operation 1210 may be performed in any of the ways described herein. For example, the scene customization system may continually update the dynamic volumetric model of the real-world scene surrounding the user based on the directly captured data representative of the real-world scene surrounding the user (e.g., the data directly captured in operation 1206) as the data representative of the real-world scene surrounding the user continues to be directly captured throughout the scene customization session.

In operation 1212, the scene customization system may identify one or more objects in the real-world scene surrounding the user. Operation 1212 may be performed in any of the ways described herein. For example, the scene customization system may identify the one or more objects within the dynamic volumetric model of the real-world scene surrounding the user.

In operation 1214, the scene customization system may replace the one or more objects identified in operation 1212 with one or more custom objects. Operation 1214 may be performed in any of the ways described herein. For example, the scene customization system may replace the one or more objects within the dynamic volumetric model and in accordance with the applied customization scheme.

In operation 1216, the scene customization system may present the custom immersive scene to the user by way of the immersive headset device. Operation 1216 may be performed in any of the ways described herein. For example, the scene customization system may present the custom immersive scene throughout the scene customization session.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 13:
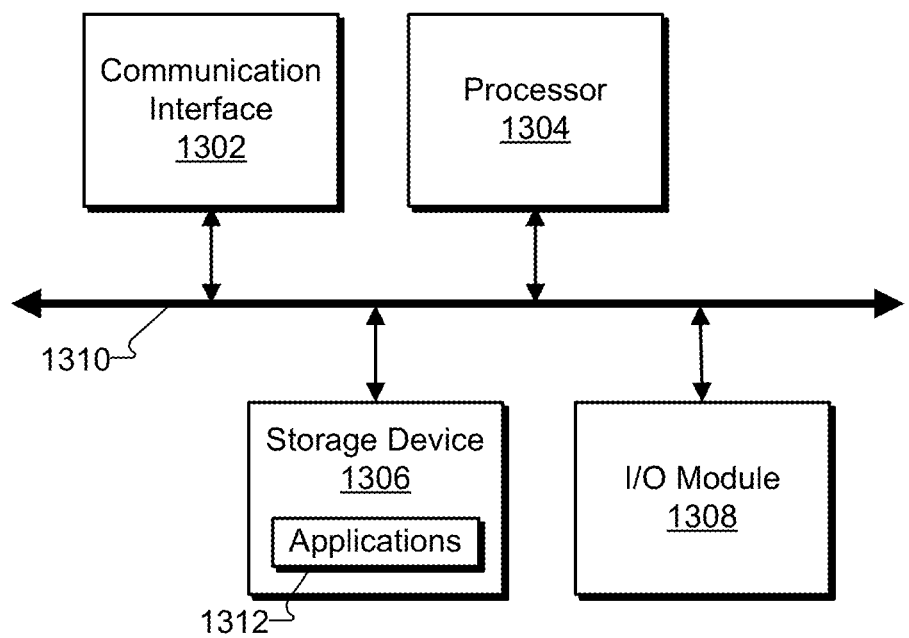
FIG. 13 illustrates an exemplary computing device according to principles described herein.

FIG. 13 illustrates an exemplary computing device 1300 that may be specifically configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may include one or more I/O modules configured to receive user input and provide user output. One or more I/O modules may be used to receive input for a single virtual reality experience. I/O module 1308 may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with facilities 102 or 104 of system 100. Likewise, storage facility 106 of system 100 may be implemented by or within storage device 1306.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a scene customization system, a selection, by a user of an artificial reality device, of a customization scheme to be applied to an original immersive scene;
   generating, by the scene customization system, a custom immersive scene based on an application of the selected customization scheme to the original immersive scene, the generating of the custom immersive scene including
      identifying, within a dynamic volumetric model of the original immersive scene, a particular object that is of a particular object type and is included in the original immersive scene, and
      replacing, within the dynamic volumetric model, the particular object with a custom object that is predetermined within the applied customization scheme to correspond to the particular object type and that is of the particular object type and accords with the applied customization scheme; and presenting, by the scene customization system, the custom immersive scene to the user by way of the artificial reality device.

2. The method of claim 1, wherein the generating of the custom immersive scene further includes:
identifying, within the dynamic volumetric model of the original immersive scene, an additional object included in the original immersive scene;
determining, based on a non-augmentable object list associated with the selected customization scheme, that the additional object is a non-augmentable object corresponding with a predefined entry on the non-augmentable object list, and
abstaining from replacing, in response to the determining that the additional object is the non-augmentable object, the additional object within the dynamic volumetric model.

3. The method of claim 1, wherein the generating of the custom immersive scene further includes:
receiving data representative of the original immersive scene;
creating the dynamic volumetric model based on the data representative of the original immersive scene; and
continually updating the dynamic volumetric model as the data representative of the original immersive scene continues to be received.

4. The method of claim 3, wherein the data representative of the original immersive is received by being captured by way of one or more sensors of the artificial reality device used by the user to experience the custom immersive scene.

5. The method of claim 1, wherein the generating of the custom immersive scene further includes receiving data representative of the dynamic volumetric model of the original immersive scene, the data representative of the dynamic volumetric model created by a scene modeling system separate from the scene customization system.

6. The method of claim 1, wherein:
the identifying of the particular object that is included in the original immersive scene includes:
receiving data representative of the original immersive scene,
identifying, based on the received data representative of the original immersive scene, one or more features of the particular object,
matching the one or more features of the particular object with one or more corresponding features of a known object documented in an object library associated with the selected customization scheme, and
determining, based on the matching of the one or more features, that the particular object is an instance of the known object documented in the object library; and
the custom object with which the particular object is replaced is a custom object that is predetermined, within the selected customization scheme, to correspond to the known object.

7. The method of claim 1, wherein:
the identifying of the particular object that is included in the original immersive scene includes:
receiving data representative of the original immersive scene,
identifying, based on the received data representative of the original immersive scene, one or more features of the particular object, and
determining, based on the one or more features of the particular object, that the particular object type is a known object type documented in an object library associated with the selected customization scheme; and
the custom object with which the particular object is replaced is a custom object that is predetermined, within the selected customization scheme, to correspond to the known object type.

8. The method of claim 1, wherein:
the original immersive scene includes a first real-world scene that is distinct from a second real-world scene in which the user is located while the custom immersive scene is presented to the user by way of the artificial reality device; and
the generating of the custom immersive scene further includes receiving data representative of the first real-world scene transmitted by a scene modeling system having elements that are disposed in a vicinity of the first real-world scene to capture data representative of the first real-world scene.

9. The method of claim 1, wherein:
the original immersive scene includes a real-world scene in which the user is located while the custom immersive scene is presented to the user by way of the artificial reality device; and
the generating of the custom immersive scene further includes capturing data representative of the real-world scene while the custom immersive scene is presented to the user by way of the artificial reality device.

10. The method of claim 1, further comprising determining, by the scene customization system, that the original immersive scene includes a known real-world scene documented in a scene library associated with the selected customization scheme; and
wherein the generating of the custom immersive scene further includes customizing the custom immersive scene in accordance with at least one preconfigured customization documented within the scene library in association with the known real-world scene.

11. The method of claim 1, further comprising:
determining, by the scene customization system while the presenting of the custom immersive scene to the user is ongoing, that another user using another artificial reality device is experiencing the original immersive scene; and
providing, by the scene customization system in response to the determining that the other user is experiencing the original immersive scene, data representative of the custom immersive scene being presented to the user by way of the artificial reality device, the data representative of the custom immersive scene configured to facilitate another generation of the custom immersive scene and another presentation of the custom immersive scene to the other user by way of the other artificial reality device.

12. A system comprising:
a memory storing instructions; and
a processor communicatively coupled to the memory and configured to execute the instructions to:
detect a selection, by a user of an artificial reality device, of a customization scheme to be applied to an original immersive scene,
generate a custom immersive scene based on an application of the selected customization scheme to the original immersive scene, the generating of the custom immersive scene including identifying, within a dynamic volumetric model of the original immersive scene, a particular object that is of a particular object type and is included in the original immersive scene, and replacing, within the dynamic volumetric model, the particular object with a custom object that is predetermined within the applied customization scheme to correspond to the particular object type and that is of the particular object type and accords with the applied customization scheme; and present the custom immersive scene to the user by way of the artificial reality device.

13. The system of claim 12, wherein the generating of the custom immersive scene further includes:

identifying, within the dynamic volumetric model of the original immersive scene, an additional object included in the original immersive scene;

determining, based on a non-augmentable object list associated with the selected customization scheme, that the additional object is a non-augmentable object corresponding with a predefined entry on the non-augmentable object list, and abstaining from replacing, in response to the determining that the additional object is the non-augmentable object, the additional object within the dynamic volumetric model.

14. The system of claim 12, wherein the generating of the custom immersive scene further includes:

receiving data representative of the original immersive scene;

creating the dynamic volumetric model based on the data representative of the original immersive scene; and continually updating the dynamic volumetric model as the data representative of the original immersive scene continues to be received.

15. The system of claim 14, wherein the data representative of the original immersive is received by being captured by way of one or more sensors of the artificial reality device used by the user to experience the custom immersive scene.

16. The system of claim 12, wherein the generating of the custom immersive scene further includes receiving data representative of the dynamic volumetric model of the original immersive scene, the data representative of the dynamic volumetric model created by a scene modeling system separate from the scene customization system.

17. The system of claim 12, wherein:

the identifying of the particular object that is included in the original immersive scene includes:

receiving data representative of the original immersive scene, identifying, based on the received data representative of the original immersive scene, one or more features of the particular object, matching the one or more features of the particular object with one or more corresponding features of a known object documented in an object library associated with the selected customization scheme, and determining, based on the matching of the one or more features, that the particular object is an instance of the known object documented in the object library; and the custom object with which the particular object is replaced is a custom object that is predetermined, within the selected customization scheme, to correspond to the known object.

18. The system of claim 12, wherein:

the identifying of the particular object that is included in the original immersive scene includes:

receiving data representative of the original immersive scene, identifying, based on the received data representative of the original immersive scene, one or more features of the particular object, and determining, based on the one or more features of the particular object, that the particular object type is a known object type documented in an object library associated with the selected customization scheme; and the custom object with which the particular object is replaced is a custom object that is predetermined, within the selected customization scheme, to correspond to the known object type.

19. A non-transitory computer-readable medium storing instructions that, when executed, direct a processor of a computing device to:

detect a selection, by a user of an artificial reality device, of a customization scheme to be applied to an original immersive scene, generate a custom immersive scene based on an application of the selected customization scheme to the original immersive scene, the generating of the custom immersive scene including identifying, within a dynamic volumetric model of the original immersive scene, a particular object that is of a particular object type and is included in the original immersive scene, and replacing, within the dynamic volumetric model, the particular object with a custom object that is predetermined within the applied customization scheme to correspond to the particular object type and that is of the particular object type and accords with the applied customization scheme; and present the custom immersive scene to the user by way of the artificial reality device.

20. The non-transitory computer-readable medium of claim 19, wherein the generating of the custom immersive scene further includes:

identifying, within the dynamic volumetric model of the original immersive scene, an additional object included in the original immersive scene;

determining, based on a non-augmentable object list associated with the selected customization scheme, that the additional object is a non-augmentable object corresponding with a predefined entry on the non-augmentable object list, and abstaining from replacing, in response to the determining that the additional object is the non-augmentable object, the additional object within the dynamic volumetric model.

* * * * *